United States Patent
Nobakht et al.

(10) Patent No.: US 11,949,695 B2
(45) Date of Patent: Apr. 2, 2024

(54) SYSTEMS AND METHODS FOR REAL-TIME NETWORK TRAFFIC ANALYSIS

(71) Applicant: THE BOEING COMPANY, Chicago, IL (US)

(72) Inventors: Ramin Nobakht, Laguna Beach, CA (US); Ronald Ward Sackman, Mountain View, CA (US); Scott Charles Sullivan, South Pasadena, CA (US)

(73) Assignee: The Boeing Company, Arlington, VA (US)

( * ) Notice: Subject to any disclaimer, the term of this patent is extended or adjusted under 35 U.S.C. 154(b) by 309 days.

(21) Appl. No.: 17/534,688

(22) Filed: Nov. 24, 2021

(65) Prior Publication Data

US 2022/0201013 A1  Jun. 23, 2022

Related U.S. Application Data

(60) Provisional application No. 63/127,844, filed on Dec. 18, 2020.

(51) Int. Cl.
*H04L 9/40* (2022.01)
(52) U.S. Cl.
CPC .......... *H04L 63/1416* (2013.01); *H04L 63/14* (2013.01); *H04L 63/1408* (2013.01);
(Continued)
(58) Field of Classification Search
None
See application file for complete search history.

(56) References Cited

U.S. PATENT DOCUMENTS 9,740,816 B2 * 8/2017 He ................. G06F 30/18
9,900,090 B1 * 2/2018 Stark ............. H04B 10/0799
(Continued)

OTHER PUBLICATIONS

Chen-Mou Cheng, H. T. Kung and Koan-Sin Tan, "Use of spectral analysis in defense against attacks," Global Telecommunications Conference, 2002. Globecom '02. IEEE, Taipei, Taiwan, 2002, pp. 2143-2148 vol. 3, doi: 10.1109/GLOCOM.2002.1189011. (Year: 2002).*

(Continued)

*Primary Examiner* — Lashonda Jacobs-Burton
(74) *Attorney, Agent, or Firm* — Armstrong Teasdale LLP

(57) ABSTRACT

A system for detecting malicious traffic flows in a network is provided. The system includes a processor. Based on packet information received for a plurality of data packets transmitted over the network the processor is programmed to calculate inter-arrival times and packet durations for the plurality of data packets. The processor is also programmed to filter the packet information to remove noise. The processor is further programmed to generate at least one histogram based on the packet information, the inter-arrival times, and the packet durations. In addition, the processor is programmed to generate a power spectral density estimate based on the packet information, the inter-arrival times, and the packet durations. Moreover, the processor is programmed to analyze the at least one histogram and the power spectral density estimate to detect one or more unexpected data flows. Furthermore, the processor is programmed to report the one or more unexpected data flows.

20 Claims, 20 Drawing Sheets

(52) U.S. Cl.
CPC ........ *H04L 63/1425* (2013.01); *H04L 63/145* (2013.01); *H04L 63/20* (2013.01)

(56) References Cited

U.S. PATENT DOCUMENTS

| | | | |
|---|---|---|---|
| 10,153,807 B1 | 12/2018 | Shi | |
| 10,868,832 B2* | 12/2020 | Li | G06F 21/552 |
| 2005/0021740 A1* | 1/2005 | Bar | H04L 63/145 |
| | | | 709/224 |
| 2012/0044819 A1* | 2/2012 | Lin | H04L 45/125 |
| | | | 370/252 |
| 2012/0240185 A1* | 9/2012 | Kapoor | H04L 41/0866 |
| | | | 726/1 |
| 2012/0284791 A1* | 11/2012 | Miller | G06F 21/554 |
| | | | 726/22 |
| 2013/0307524 A1* | 11/2013 | Shavitt | G06F 17/18 |
| | | | 324/76.39 |
| 2014/0341309 A1 | 11/2014 | Nguyen et al. | |
| 2015/0381660 A1* | 12/2015 | Hsiung | H04L 41/12 |
| | | | 726/1 |
| 2016/0142435 A1* | 5/2016 | Bernstein | H04L 63/1425 |
| | | | 726/23 |
| 2018/0167404 A1* | 6/2018 | Machlica | H04L 63/1441 |
| 2018/0316693 A1* | 11/2018 | Zhang | H04L 63/1416 |
| 2019/0199604 A1* | 6/2019 | Barsumian | H04L 43/16 |
| 2021/0026341 A1* | 1/2021 | Iizuka | G05B 13/042 |
| 2021/0075738 A1* | 3/2021 | Clemm | H04L 69/22 |
| 2022/0201013 A1* | 6/2022 | Nobakht | H04L 63/1416 |

OTHER PUBLICATIONS

S. S. Kim and A. L. N. Reddy, "Statistical Techniques for Detecting Traffic Anomalies Through Packet Header Data," in IEEE/ACM Transactions on Networking, vol. 16, No. 3, pp. 562-575, Jun. 2008, doi: 10.1109/TNET.2007.902685. (Year: 2008).*

Dymora, P.; Mazurek, M. Anomaly Detection in IoT Communication Network Based on Spectral Analysis and Hurst Exponent. Appl. Sci. 2019, 9, 5319. https://doi.org/10.3390/app9245319 (Year: 2019).*

Paul, Tuhin et al., Fast-Flux Botnet Detection from Network Traffic, 2014 Annual IEEE India Conference (INDICON), Dec. 11, 2014, pp. 1-6.

Extended European Search Report and Written Opinion issued in European patent application No. 21209852.9 dated Apr. 25, 2022, pp. 1-8.

* cited by examiner

SYSTEMS AND METHODS FOR REAL-TIME NETWORK TRAFFIC ANALYSIS

CROSS-REFERENCE TO RELATED APPLICATIONS

This application claims priority to U.S. Provisional Patent Application Ser. No. 63/127,844, filed Dec. 18, 2020, entitled "SYSTEMS AND METHODS FOR REAL-TIME NETWORK TRAFFIC ANALYSIS," the entire contents and disclosures of which are hereby incorporated herein by reference in its entirety.

BACKGROUND

The field relates generally to network traffic analysis, and more specifically, to detecting malicious traffic flows in traffic in a known, controlled, and constantly changing environment.

Communication systems, including communication satellites, are potential targets for malicious actors. Detecting intrusions by these malicious actors can be difficult as monitoring every communication between satellites and other communication systems may not be practical as the configurations and topology of the devices and networks can be constantly changing over time.

Furthermore, many of the traffic flows between network devices, such as satellites, and other systems are encrypted, which slows down and potentially prevents analysis of the messages being transmitted. In many situations, the intrusion detection systems need to be able to analyze messages in real-time and to be able to handle messages that are intermittent or are short. Accordingly, additional security or systems that improve the detection capabilities of communication systems would be advantageous.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a system for detecting malicious traffic flows in a network is provided. The system includes a computer system including at least one processor in communication with at least one memory device. Based on packet information received for a plurality of data packets transmitted over the network, the at least one processor is programmed to calculate inter-arrival times and packet durations for the plurality of data packets. The at least one processor is also programmed to filter the packet information to remove noise. The at least one processor is further programmed to generate at least one histogram based on the packet information, the inter-arrival times, and the packet durations. The at least one processor is further programmed to generate a power spectral density estimate based on the packet information, the inter-arrival times, and the packet durations. In addition, the at least one processor is programmed to analyze the at least one histogram and the power spectral density estimate to detect one or more unexpected data flows. Moreover, the at least one processor is programmed to report the one or more unexpected data flows.

In another aspect, a method for detecting malicious traffic flows in a network is provided. The method is implemented by a computer system including at least one processor in communication with at least one memory device. The method further includes receiving, by the processor, packet information for a plurality of data packets transmitted over the network. The method also includes calculating, by the processor, inter-arrival times for the plurality of data packets based on the packet information. In addition, the method includes calculating, by the processor, packet durations for the plurality of data packets based on the packet information. Moreover, the method includes filtering, by the processor, the packet information to remove noise. Furthermore, the method includes generating, by the processor, at least one histogram based on the packet information, the inter-arrival times, and the packet durations. In addition, the method also includes generating, by the processor, power spectral density estimate based on the packet information, the inter-arrival times, and the packet durations. In addition, the method further includes analyzing, by the processor, the at least one histogram and the power spectral density estimate to detect one or more unexpected data flows. Moreover, the method also includes reporting, by the processor, the one or more unexpected data flows.

In a further aspect, a system for detecting malicious traffic flows in a network is provided. The system includes a computer system including at least one processor in communication with at least one memory device. The at least one processor is programmed to receive a security policy to execute on the system, wherein the security policy includes configuration data. The at least one processor is also programmed to receive packet information for a plurality of data packets transmitted over the network. The at least one processor is further programmed to calculate inter-arrival times for the plurality of data packets based on the packet information and the security policy. In addition, the at least one processor is programmed to calculate, by the processor, packet durations for the plurality of data packets based on the packet information. Moreover, the at least one processor is programmed to filter the packet information to remove noise based on the security policy. Furthermore, the at least one processor is programmed to generate at least one histogram based on the packet information, the inter-arrival times, and the packet durations. In addition, the at least one processor is also programmed to generate a power spectral density estimate based on the packet information, the inter-arrival times, and the packet durations. In addition, the at least one processor is further programmed to analyze the at least one histogram and the power spectral density estimate to detect one or more unexpected data flows based on the security policy. Moreover, the at least one processor is also programmed to and report the one or more unexpected data flows.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The Figures described below depict various aspects of the systems and methods disclosed therein. It should be understood that each Figure depicts an example of a particular aspect of the disclosed systems and methods, and that each of the Figures is intended to accord with a possible example thereof. Further, wherever possible, the following description refers to the reference numerals included in the following Figures, in which features depicted in multiple Figures are designated with consistent reference numerals.

There are shown in the drawing arrangements, which are presently discussed, it being understood, however, that the present examples are not limited to the precise arrangements and instrumentalities shown, wherein.

DETAILED DESCRIPTION

Figure 1:
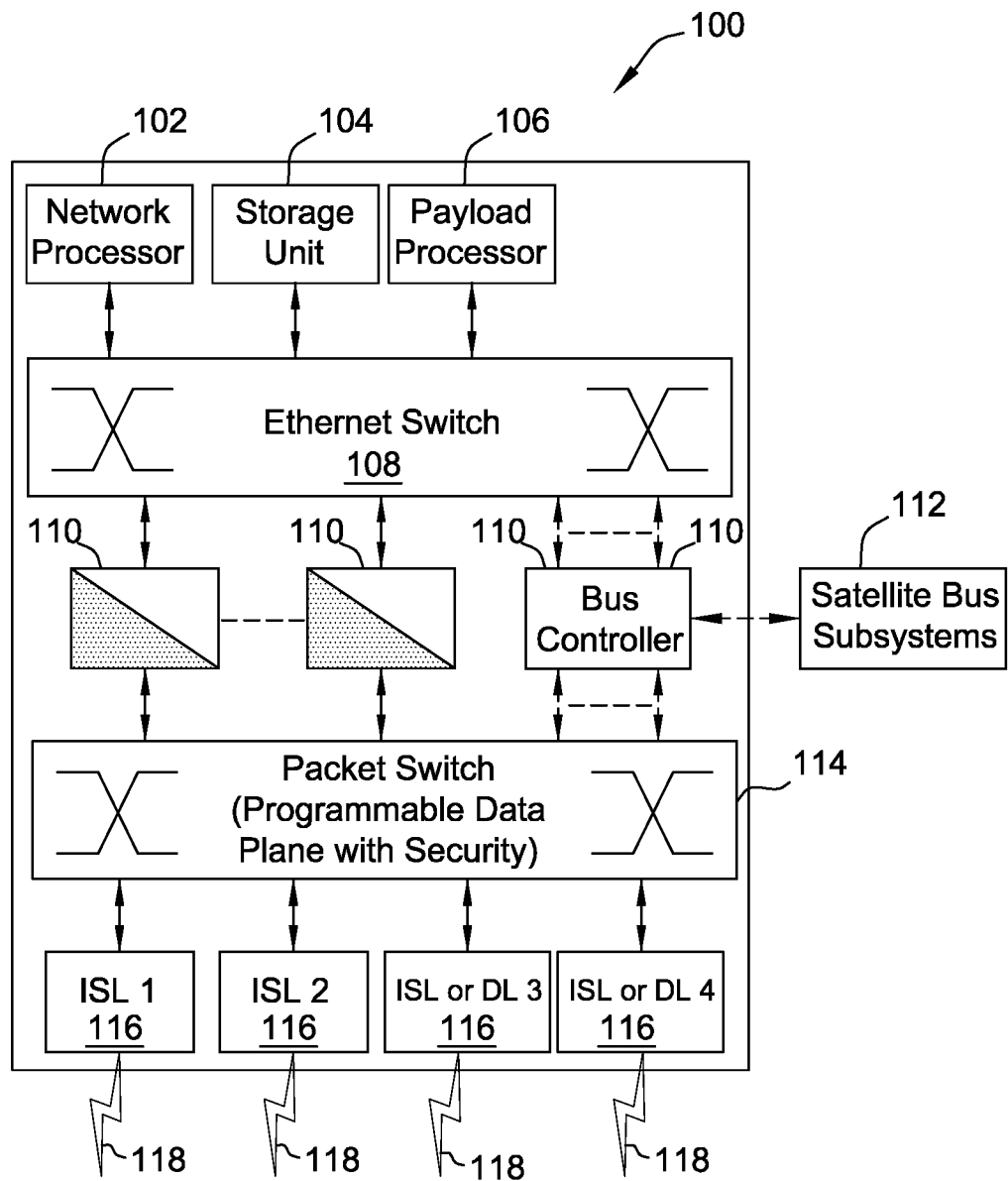
FIG. 1 illustrates a block diagram of an example communication satellite system, in accordance with one example of the present disclosure.

The field relates generally to intrusion detection, and more specifically, to detecting malicious traffic flows in encrypted traffic in a known, controlled, and constantly changing environment. In one example, a communication network analyzer ("CNA") computer device determines a communication network based on the current time and the available communication devices, activates an algorithm with a security policy to monitor the packets transmitted over the communication network. The systems and methods described herein are designed to be able to monitor traffic in real-time while not being dependent on the communication protocols that are in use on the network.

In typical network traffic, various packet types (flows) may not arrive at predetermined rates. This may cause problems with distinguishing spurious packet types with low frequency of arrival using standard techniques. In addition, various packet types may have varying durations, where shorter duration packets can have lower energy and lower signatures when standard techniques are used.

The analysis technique described herein combines power spectral density (PSD) estimation with histogram data to enhance the energy of the packet types (flows) with lower frequency of arrivals or shorter durations to allow for improved detection and analysis of these flows. This analysis technique generates distinct and visible signatures for all packet types (flows) and enhances the signatures of non-periodic and spurious packet arrival times. The analysis technique also reduces the amount of captured data required for effective analysis. In most case, the more accurate analysis required, the more data needed to be fed to the analysis. However, in many situations, such as in real-time analysis, there might not be that much data and/or time to process. By enhancing the signature and visibility of the packets, the amount of data necessary to properly analyze the network traffic can be reduced. By combining the PSD analysis with the histogram data, the system can add resolution and/or accuracy to the information about the packets being analyzed, such as, but not limited to, number of packets in each flow, type of packets, packet size, frequency, and data rates.

The system and methods disclosed herein are described as being executed by a CNA computer device. In one example, the CNA computer device is the dataplane of a switch of a network communication device as traffic is coming through the switch. In other examples, the CNA computer device could also be, but is not limited to, a network card, repeater hub, network bridge, switching hub, bridging hub, MAC bridge, a tap port, or any other device configured to read messages, such as packets, either inside or outside of the dataplane.

The CNA computer device determines information about packets that are arriving from and/or being transmitted to the network. This information includes packet arrival times (seconds), packet length (bits), and packet content bit rate (bits per second). With this information, the CNA computer device analyzes the packets to find the existence of an unwanted series or set of packets by analyzing the presence, shape, form, and/or frequencies of the packets that the CNA computer device is analyzing.

The CNA computer device generates histogram and PSD data based on the information about the packets to compare against the expected flows to detect unexpected data flows in the traffic.

Described herein are computer systems such as the CNA computer devices and related computer systems. As described herein, such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The systems and processes are not limited to the specific examples described herein. In addition, components of each system and each process can be practiced independent and separate from other components and processes described herein. Each component and process also can be used in combination with other assembly packages and processes.

FIG. 1 illustrates a block diagram of an example communication satellite system 100, in accordance with one example of the present disclosure. The example satellite system 100 includes a network processor 102, a storage unit 104, and a payload processor 106, which are all connected to an Ethernet switch 108. The Ethernet switch 108 is further connected to one or more bus controllers 110, which facilitate communication with satellite bus subsystems 112 and a packet switch 114. In some examples, the packet switch 114 is a programmable data plane with security that allows for the execution of algorithms to monitor a plurality of ports 116 that are used for communication connections 118 from and to the satellite 100. The plurality of connections 118 can include, but are not limited to, inter-satellite links (ISL), down links (DL), and ports 116 that can act as either ISL or DL.

Figure 2:
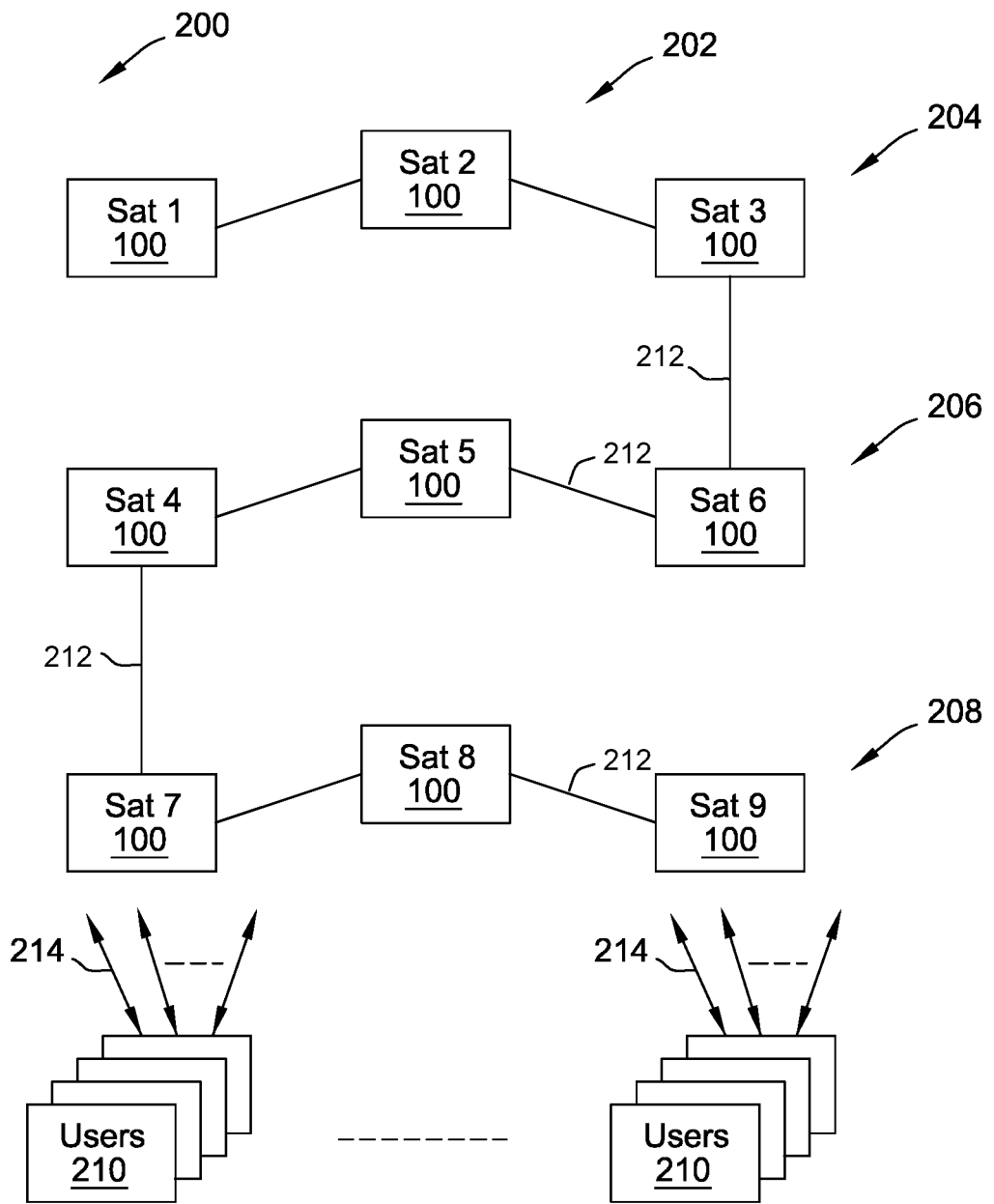
FIG. 2 illustrates a block diagram of an example network in a first network configuration including the example communication satellite system shown in FIG. 1.

FIG. 2 illustrates a block diagram of an example network 200 in a first network configuration 202 including the example communication satellite system 100 (shown in FIG. 1). Network 200 includes a plurality of satellites 100. As shown in the first network configuration 202, the plurality of satellites 100 are at a plurality of orbits, such as geosynchronous earth orbit (GEO) 204, medium earth orbit (MEO) 206, and low earth orbit (LEO) 208. Network 200 can also include satellites 100 in highly elliptical orbit, lunar orbits, or any other non-geostationary (NGSO) orbit around celestial bodies, where their connections and locations are known and/or can be predicted.

Network 200 also includes a plurality of user devices 210. The user devices 210 can include aircraft, spacecraft, watercraft, ground-based vehicles, ground stations, and/or space stations, where the user devices 210 connect to the network 200.

As shown in the first network configuration 202, the satellites 100 each have one or more ISL connections 212. There are also DL connections 214 to the satellites 100 from the user devices 210. While not shown as directly connected in FIG. 2, each DL connection 214 connects a user device 210 on the network 200 to a satellite 100.

Per the nature of satellites 100, the different satellites 100 orbit the earth at different rates, such that the satellites 100 in the network configuration 202 at time A will be different than that at time B. For example, satellites 100 in LEO 208 will orbit the Earth in 90 to 120 minutes, while those in MEO 206 may take 12 hours to complete an orbit. This means that the satellites 100 that make up the network 200 will change overtime. Accordingly, knowing when the network configuration 202 of the network 200 will change is important to properly securing and monitoring the network 200.

Figure 3:
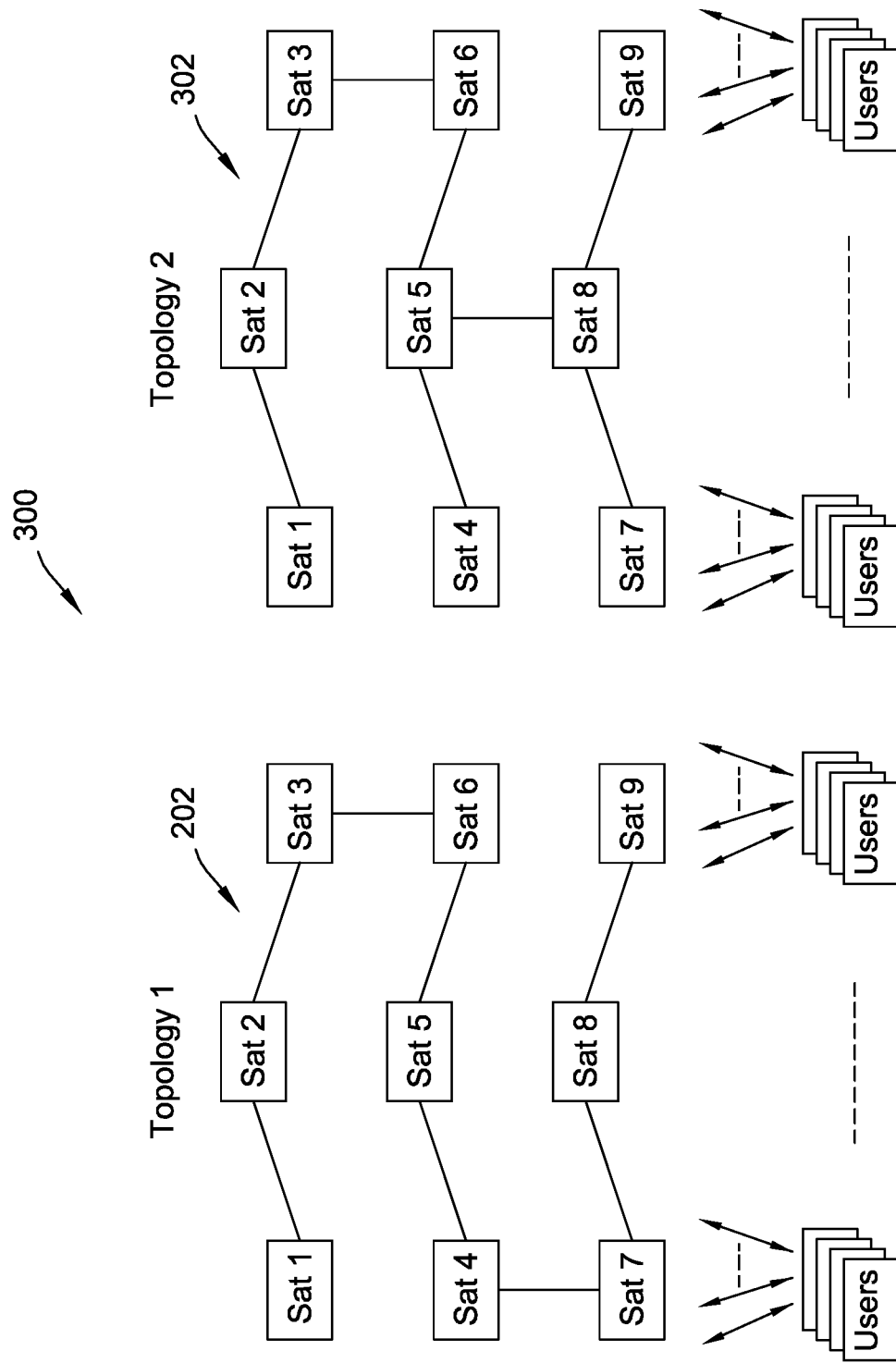
FIG. 3 illustrates a block diagram of a transition from the first network configuration shown in FIG. 2 to a second network configuration.

FIG. 3 illustrates a block diagram of a transition 300 from the first network configuration 202 to a second network configuration 302. In the transition 300, the ISL connection 212 between satellite #4 and satellite #7 ends and a new ISL connection 212 is created between satellite #5 and satellite #8.

Each network configuration 202 and 302 represents the network 200 at a different point in time. While, the different network configurations 202 and 302 shown herein are related to satellites, the systems and methods described herein will also work with other types of computer networks 200 where multiple user devices 210 are connected.

Figure 4:
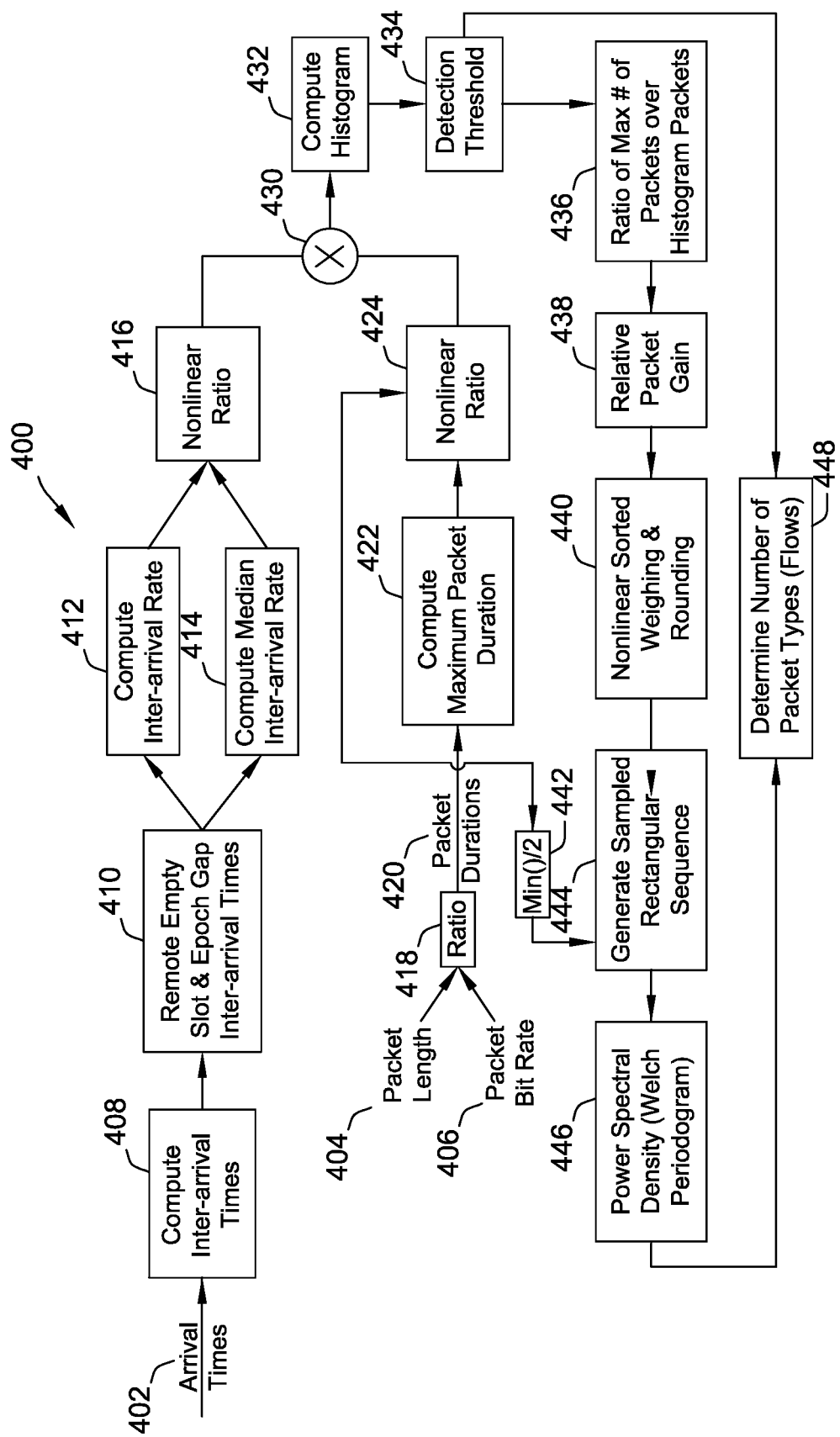
FIG. 4 illustrates an example algorithm for analyzing traffic flow data to detect malicious data flows in the system shown in FIG. 1 and the network shown in FIG. 2.

FIG. 4 illustrates an example algorithm 400 for analyzing traffic flow data to detect malicious data flows in the system 100 (shown in FIG. 1) and other similar system and a network, such as network 200 (shown in FIG. 2). The steps of algorithm 400 are performed by the packet switch 114 (shown in FIG. 1). The packet switch 114 is programmed to monitor data flows transmitted by or received by a port 116 (shown in FIG. 1). The packet switch 114 uses algorithm 400 to monitor the data flows on the port 116. In one example, the packet switch 114 stores one or more security policies, where the security policies relate to a configuration of the network 200, such as configuration 202 and 302 (both shown in FIG. 3). In at least one example, the security policy includes information about the network configuration and how the traffic is supposed to flow. In some examples, the packet switch 114 is co-located with another processor, wherein the co-located processor performs one or more steps of algorithm 400, such as the analysis steps.

The packet switch 114 determines three different input packet characteristics based on either data packets received or transmitted. These inputs include, but are not limited to, packet arrival times 402, packet length 404, and packet bit rate 406.

Using the arrival times 402, the packet switch 114 computes 408 inter-arrival times, which is the duration between the arrival of data packets. The packet switch 114 determines the minimum gap length either based on packet statistics or prior knowledge, such as that provided in a security policy. If the distance between adjacent packet arrivals exceeds a predetermined criterion (e.g., threshold amount), the packet switch 114 recognizes a gap and reduces the inter-arrival time to the median inter-arrival time. The packet switch 114 removes the gap periods since such gaps may introduce distortions in the analysis results. The packet switch 114 computes 412 the inter-arrival rate and computes the median 414 inter-arrival rate. The inter-arrival rate 412 and the median inter-arrival rate 414 are combined in a non-linear ratio 416. The inter-arrival rate 412 represents the rate of arrival of data packets associated with the corresponding flow.

Using packet length 404 and packet bit rate 406, the packet switch 114 generates a ratio 418 to calculate packet durations 420. The packet switch 114 computes 422 the maximum packet duration to generate a nonlinear ratio 424 of the packet durations 420 relative to the largest packet duration.

The results of the inter-arrival times nonlinear ratio 416 and the packet duration nonlinear ratio 424 are combined 430 and used to compute 432 one or more histograms. The packet switch 114 applies a detection criterion (e.g., threshold) 434 to the histogram to reduce and/or overcome jitter or noise. In computer networks, such as network 200, there can be a lot of jitter based on the number of repeater links that each packet goes through, with more links adding more jitter. By applying the detection threshold 434 to the histogram, anything above the detection threshold 434 is kept as actual data packets, while anything below the detection threshold 434 is discarded as jitter. The detection threshold 434 can be calculated by the packet switch 114. The detection threshold 434 can also be pre-computed and based on the network configuration 202 and provided in a security policy.

Next the packet switch 114 performs several steps to properly apply histogram generated data for PSD analysis.

These steps include, but are not limited to, determining the ratio 436 of the max number of data packets over the histogram packets, determining relative packet gain 438, and determining nonlinear sorted weighing and rounding 440. The goal is to maintain a positive signal to noise ratio for low duration and bursty packets.

Then, the packet switch 114 uses half of the minimum 442 of the packet duration as sample time to generate 444 a sampled rectangular sequence, which represents the enhanced data packets as a rectangular sequence of data packets where the duration is representative of the actual data packets and the amplitude is representative of the energy assigned to the data packets.

The packet switch 114 analyzes the power spectral density data to show at what frequencies various packet sequences are occurring. In the example, the power spectral density estimate 446 is calculated using the Welch periodogram. The packet switch 114 combines the power spectral density estimate 446 with the data packets that exceeded the detection threshold 434 with the histogram 432 to determine 448 the detected packet types (flows). The histogram data includes the number of data packets in each flow. The security policy includes expected flows. The packet switch 114 compares the expected flows to the detected flows to detect any unexpected flows. In one example, the packet switch 114 removes the expected flows from the detected flows in the histogram 432 to determine if there are any unexpected flows remaining in the altered histogram.

Since the topology of the network 200 is known, anything beyond that is unexpected and therefore anomalous and potentially malicious. When unexpected data is detected, the packet switch 114 transmits a notification that there are unexpected flows. The packet switch 114 can also provide the frequency, arrival times, durations, and/or number of anomalous data packets. The anomalous data packets could indicate a malicious threat, or a misconfiguration of the security policy that the packet switch 114 was using for analysis. The packet switch 114 can notify an operations center, a security center, or take an action. Actions could include, but are not limited to, providing additional notifications, alerts, triggering another program, changing the topology of the network, and/or blocking traffic.

FIGS. 5 through 14 illustrate the results of an analysis of different example flows using the algorithm 400 (shown in FIG. 4 and performed by packet switch 114). Table 1 below shows the different flows that could be contained in each analysis. For the purposes of this analysis, Flow 1 is the only expected flow. Flow 1 provides 128,000 data packets of 1500 B at 25 kHz with a flow data rate of 300 Mbps.

TABLE 1

| Flow Number | Packet Size (in Byte) | Packets per Second | Number of Packets | Flow Data Rate |
|---|---|---|---|---|
| 1 | 1500 B | 25,000 | 128,000 | 300 Mbps |
| 2 | 1500 B | 2 | 10 | 24 Kbps |
| 3 | 1500 B | 20 | 100 | 240 Kbps |
| 4 | 100 B | 2 | 10 | 1.6 Kbps |
| 5 | 100 B | 20 | 100 | 16 Kbps |

Figure 5:
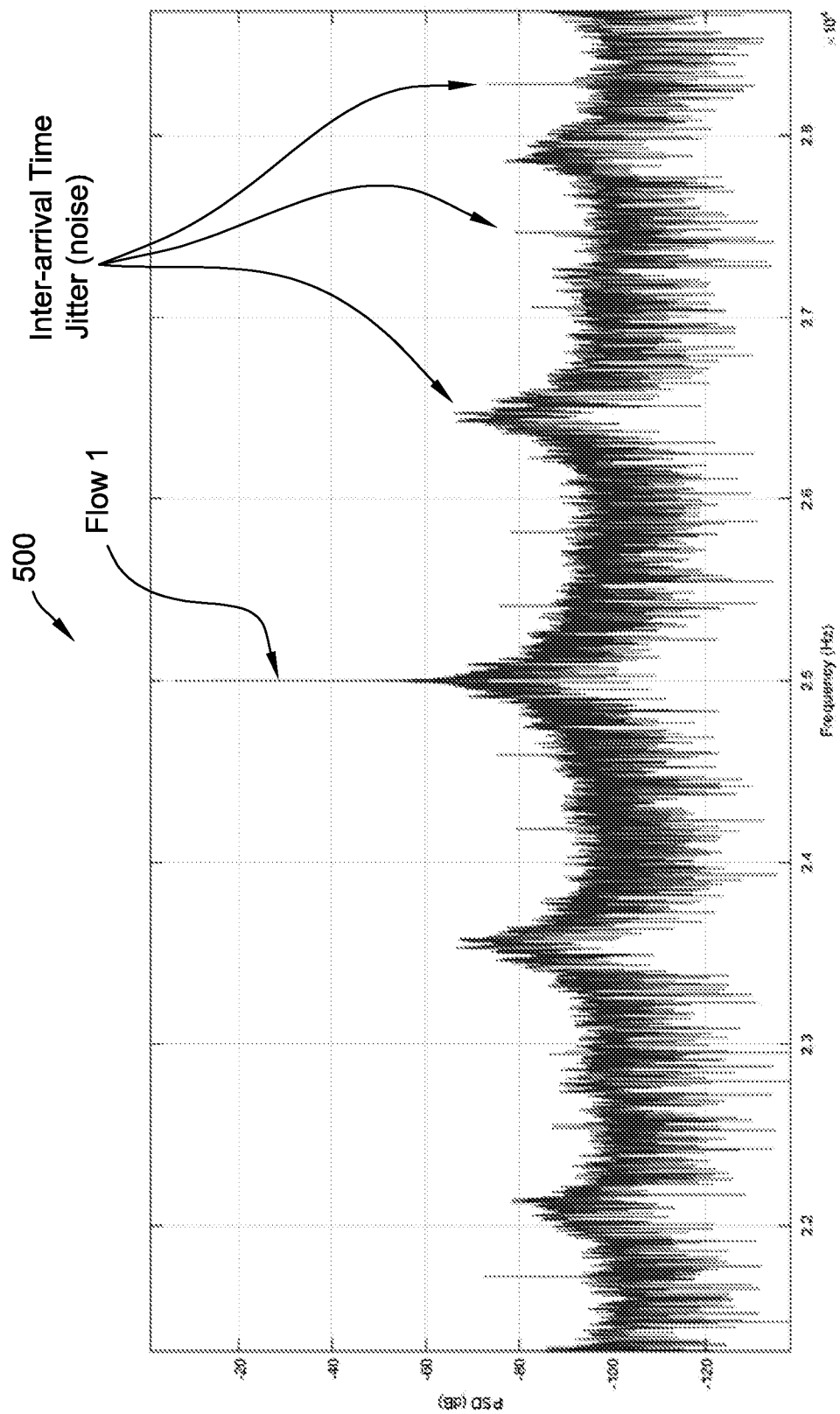
FIG. 5 illustrates a first graph of a first analysis of traffic flows using the algorithm shown in FIG. 4.

FIG. 5 illustrates a first graph 500 of a first analysis of traffic flows using the algorithm 400 (shown in FIG. 4). Graph 500 illustrates a power spectral density plot of Flow 1. Graph 500 includes the frequency of the packet arrivals for the various packet types on the x-axis in kilohertz (kHz) and the power spectral density (PSD) in decibels (dB) on the y-axis. In the center of graph 500, Flow 1 is shown at 25 kHz. The other components shown in graph 500 are inter-arrival jitter, which are less than −70 dB.

Figure 6:
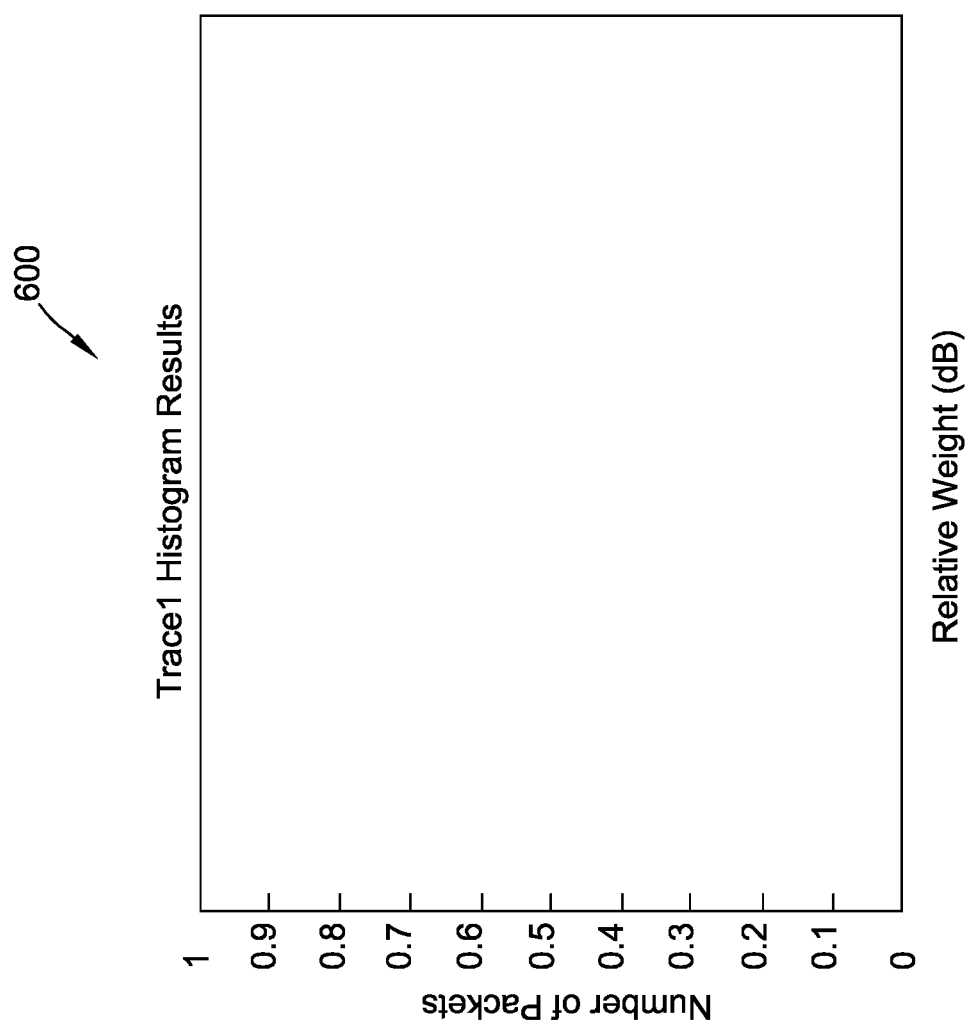
FIG. 6 illustrates a first histogram of the first analysis of traffic flows shown in FIG. 5.

FIG. 6 illustrates a first histogram 600 of the first analysis of traffic flows shown in FIG. 5. For the purposes of algorithm 400 (shown in FIG. 4) the dominant flow is excluded from the histogram 600. This allows the packet switch 114 (or a co-located processor) to identify the additional flows shown in the histogram 600. The histograms 600 include the relative weight in dB on the x-axis and the number of packets on the y-axis. By excluding the dominant flow, the histogram 600 can display the information about the other detected flows without being overshadowed by the dominant flow. For the purposes of this discussion, the dominant flow (Flow 1) is the expected flow and all other flows are unexpected and potentially malicious. The packet switch 114 removes all of the expected flows from the histogram 600 to concentrate on the unexpected flows. In the ideal state, the histogram 600 is blank because there are no unexpected flows.

Figure 7:
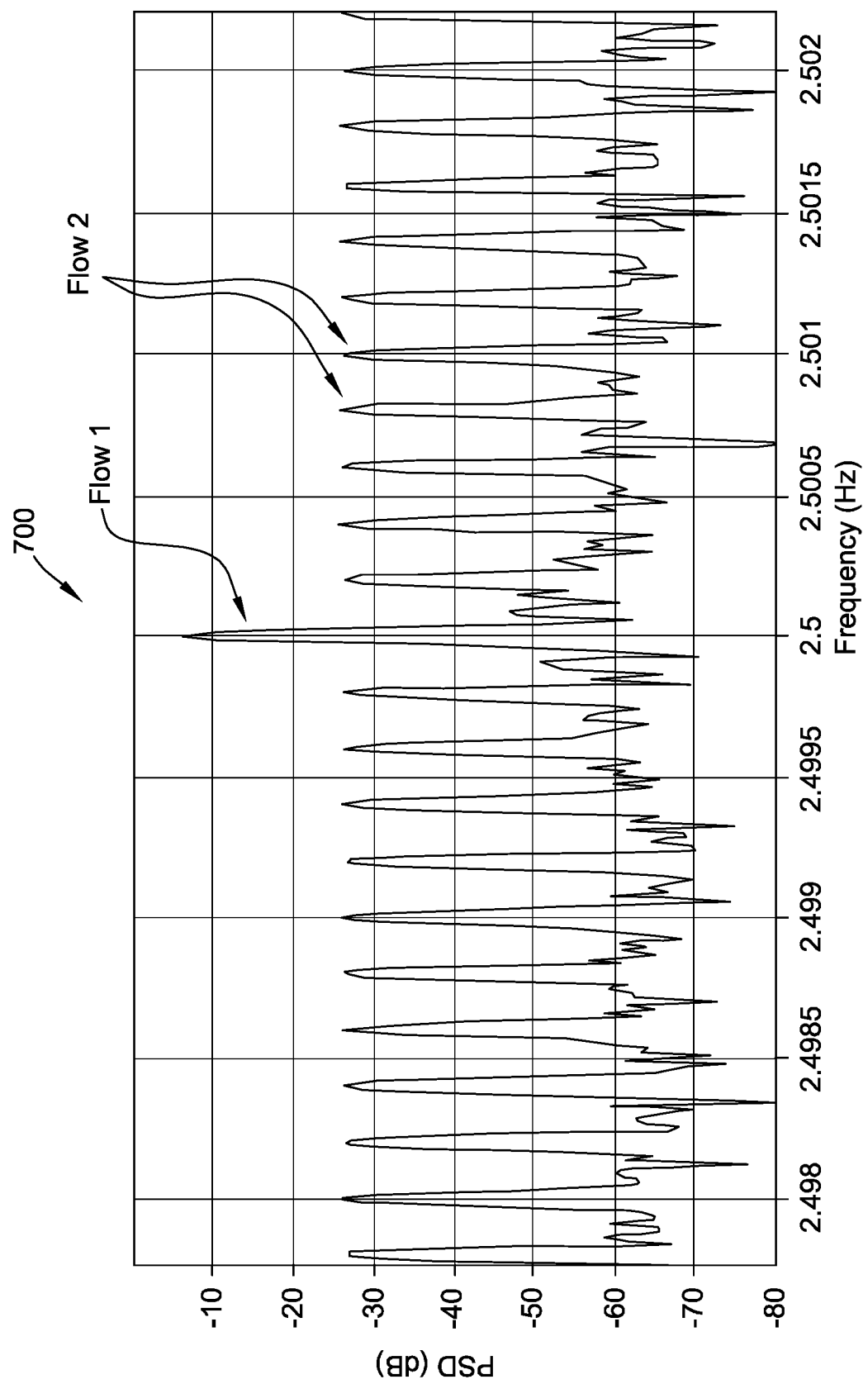
FIG. 7 illustrates a second graph of a second analysis of traffic flows using the algorithm shown in FIG. 4.
Figure 8:
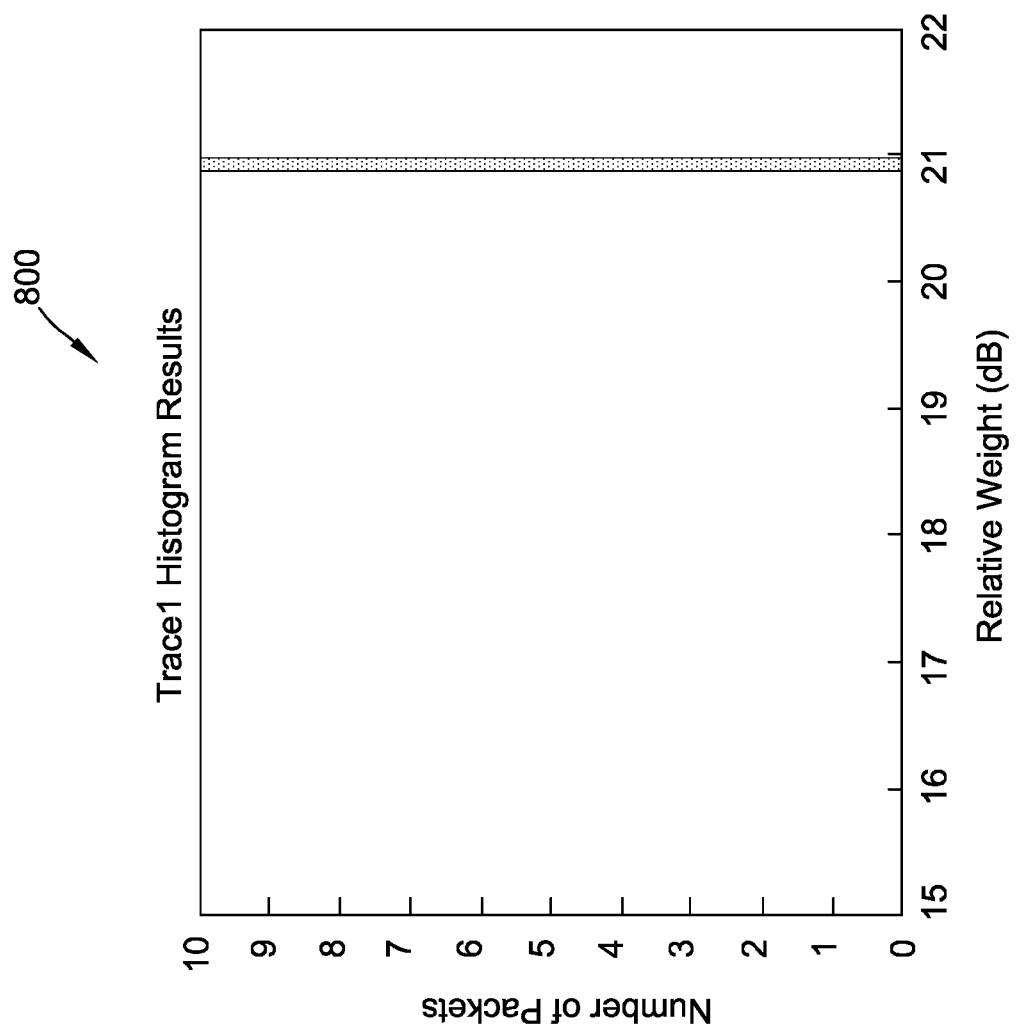
FIG. 8 illustrates a second histogram of the second analysis of traffic flows shown in FIG. 7.

FIG. 7 illustrates a second graph 700 of a second analysis of traffic flows using the algorithm 400 (shown in FIG. 4). Graph 700 shows the dominant flow (Flow 1) at 25 kHz and a second flow repeating every 2 Hz. This second flow is Flow 2 from Table 1. FIG. 8 illustrates a second histogram 800 of the second analysis of traffic flows shown in FIG. 7. The histogram 800 shows Flow 2 with 10 packets. The dominant flow (Flow 1) is excluded from the histogram 800. Therefore, the second flow is 2 packets per second for a total of 10 packets.

Figure 9:
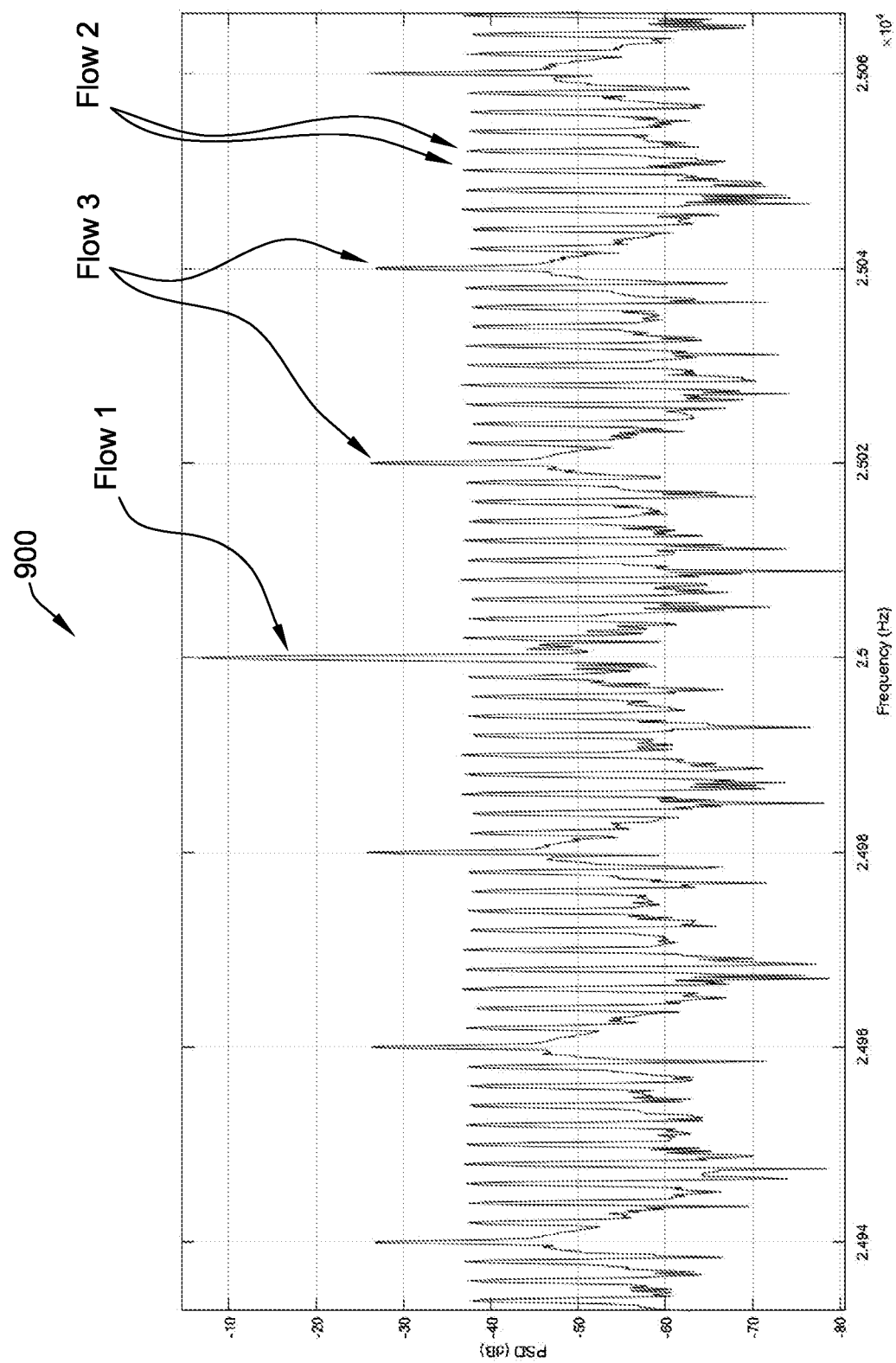
FIG. 9 illustrates a third graph of a third analysis of traffic flows using the algorithm shown in FIG. 4.
Figure 10:
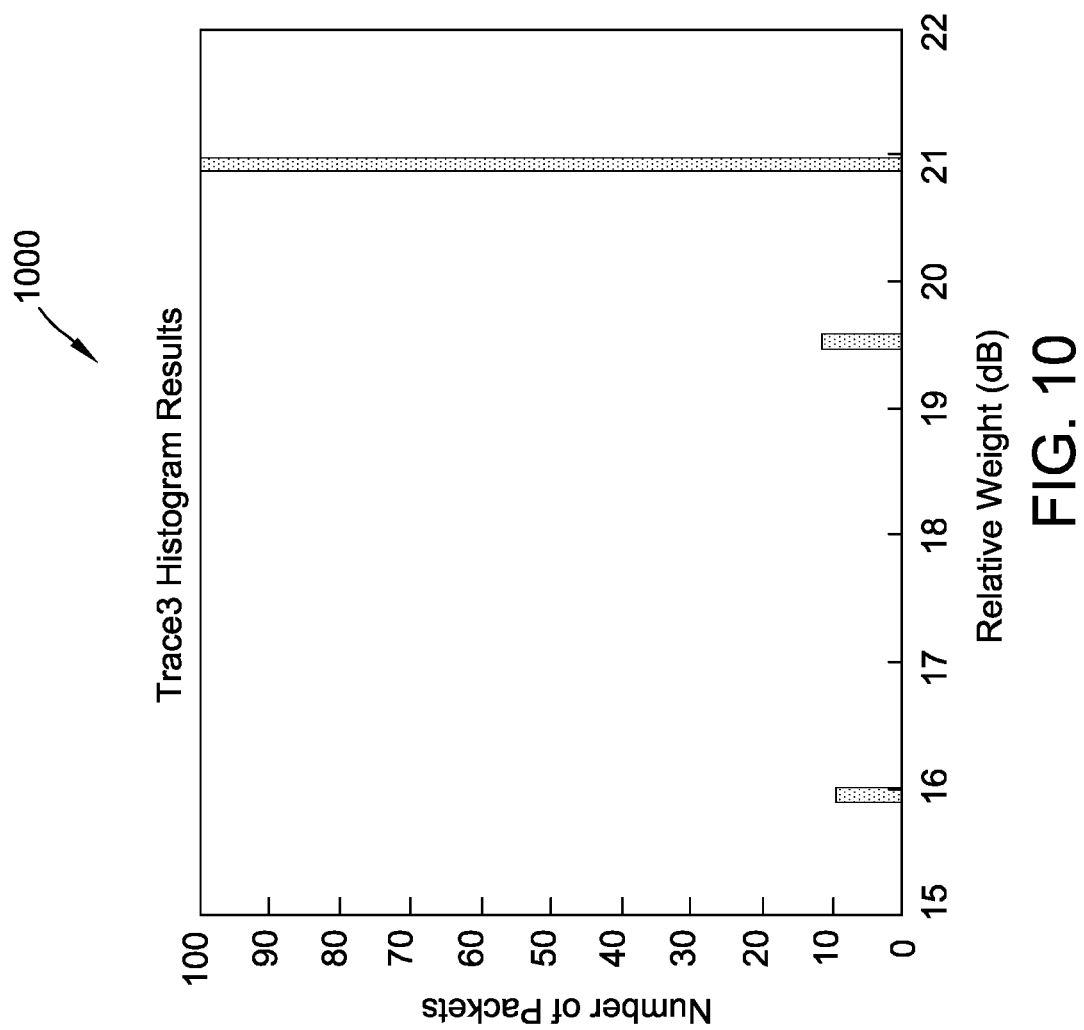
FIG. 10 illustrates a third histogram of the third analysis of traffic flows shown in FIG. 9.

FIG. 9 illustrates a third graph 900 of a third analysis of traffic flows using the algorithm 400 (shown in FIG. 4). Graph 900 shows the dominant flow (Flow 1) at 25 kHz, a second flow repeating every 20 Hz (Flow 3), and a third flow repeating every 2 Hz (Flow 2). FIG. 10 illustrates a third histogram 1000 of the third analysis of traffic flows shown in FIG. 9. Histogram 1000 shows ~10 packets at 16 dB, 1 packet at 17 dB, ~10 packets at 19.5 dB, and ~100 packets at 21 dB. For the purposes of analysis, the sets of packets within 2 dB of each other are considered to be a part of the same flow but have been affected by jitter. Therefore, the 1 packet at 17 dB is a part of the packets at 16 dB, and the 10 packets at ~19.5 dB are part of the packets at 21 dB. As seen in FIGS. 9 and 10, the detection threshold 434 removed the majority of the jitter, but some still remains. However, for analysis purposes, this is acceptable because the dominant flow is clearly visible on graph 900. Accordingly, the second flow is providing 100 packets at 20 packets per second and the third flow is providing 10 packets at 2 packets per second.

Figure 11:
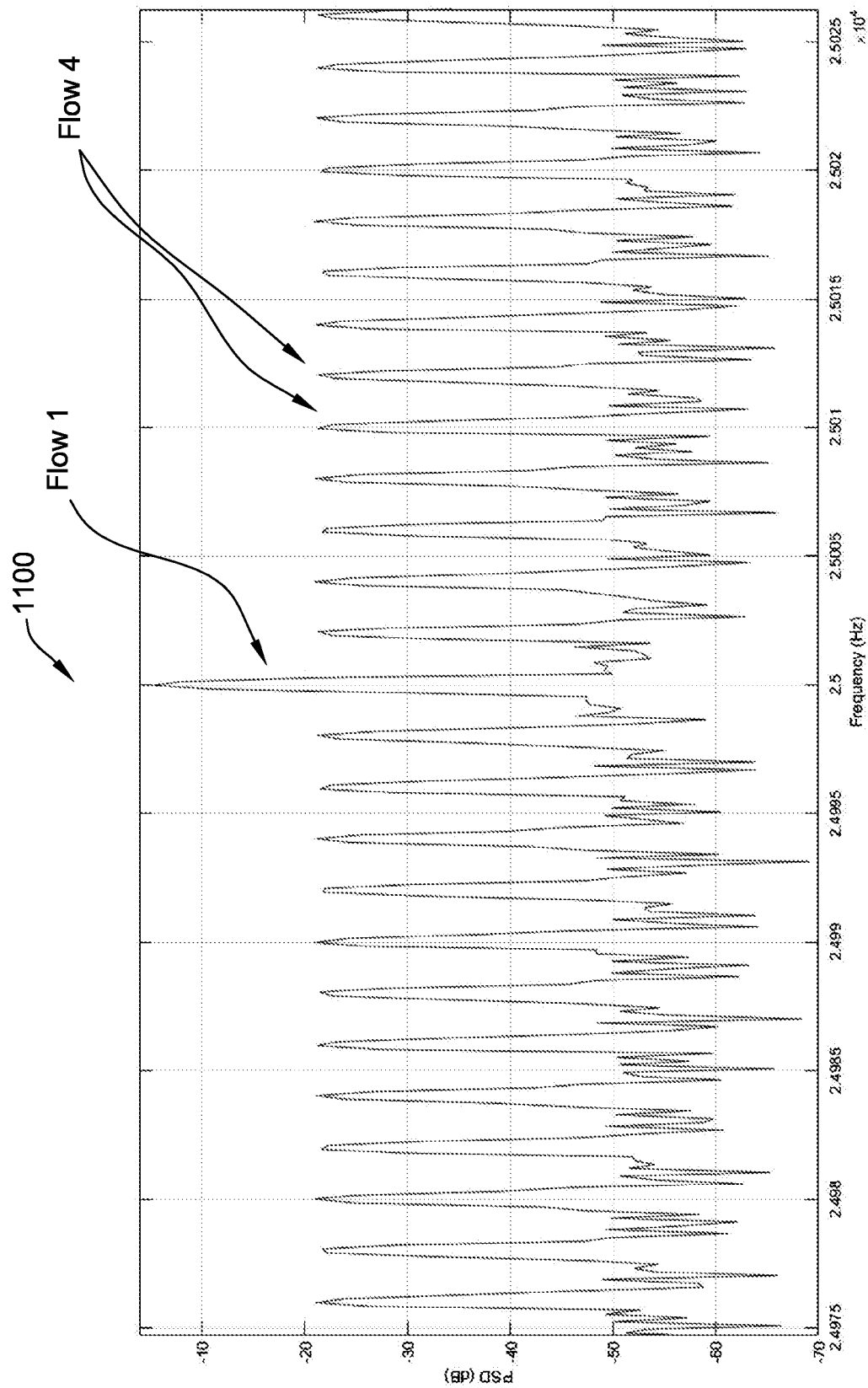
FIG. 11 illustrates a fourth graph of a fourth analysis of traffic flows using the algorithm shown in FIG. 4.
Figure 12:
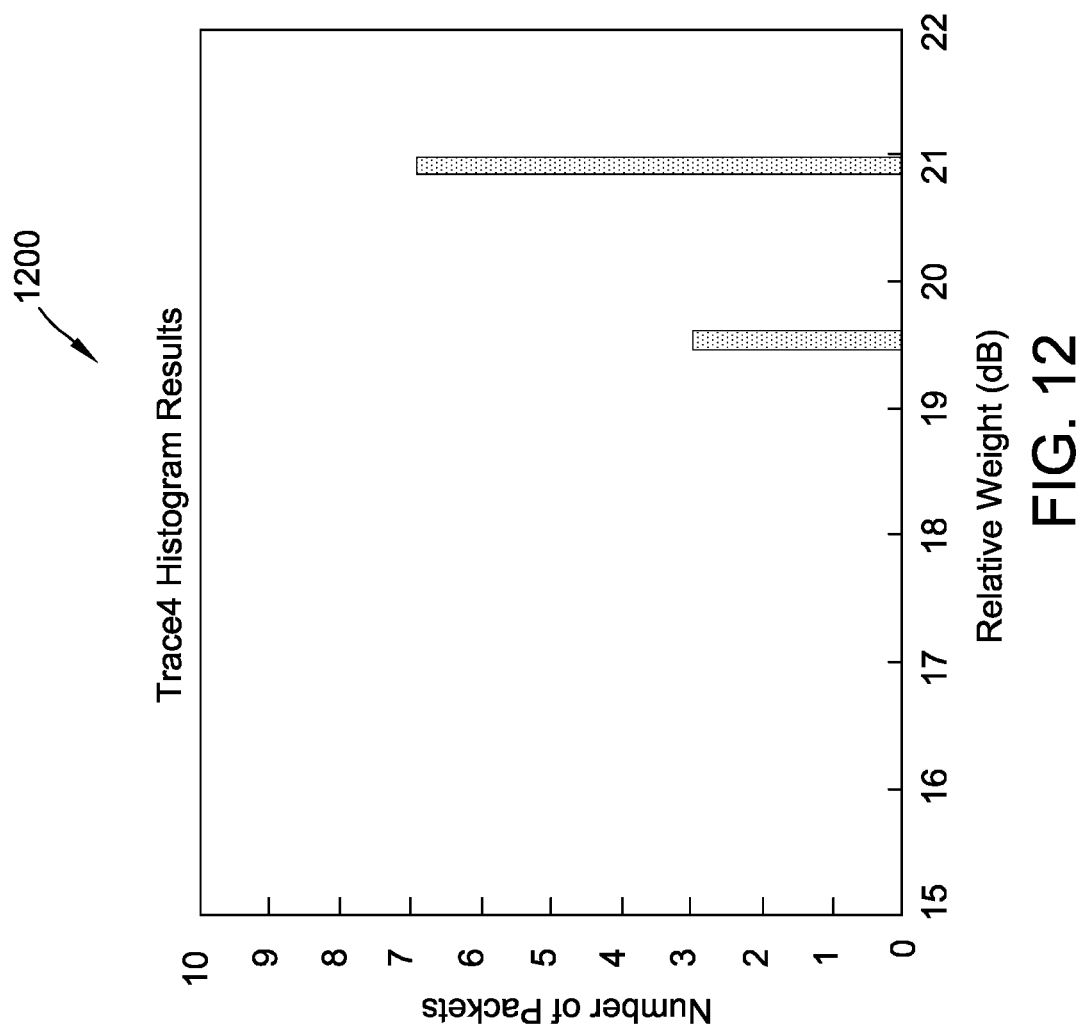
FIG. 12 illustrates a fourth histogram of the fourth analysis of traffic flows shown in FIG. 11.

While Flows 1, 2, and 3 all have packets of 1500 bytes, algorithm 400 can detect packets of different byte sizes. In FIGS. 11 and 12 the packets in the dominant flow (Flow 1) remain at a size of 1500 bytes, while the packets for the second flow (Flow 4) are only 100 bytes long. Furthermore, the algorithm 400 detects the different flows at their different flow data rates. Flow 1 has a flow data of 300 Mbps, while Flow 4 has a flow data rate of 1.6 Kbps. FIG. 11 illustrates a fourth graph 1100 of a fourth analysis of traffic flows using the algorithm 400 (shown in FIG. 4). Graph 1100 shows the dominant flow at 25 kHz (Flow 1) and a second flow repeatedly at 2 Hz (Flow 4). FIG. 12 illustrates a fourth histogram 1200 of the fourth analysis of traffic flows shown in FIG. 11. Histogram 1200 illustrates 3 packets at 19.5 dB and 7 packets at 21 dB. Accordingly, the second flow is providing 10 packets at 2 packets per second.

Figure 13:
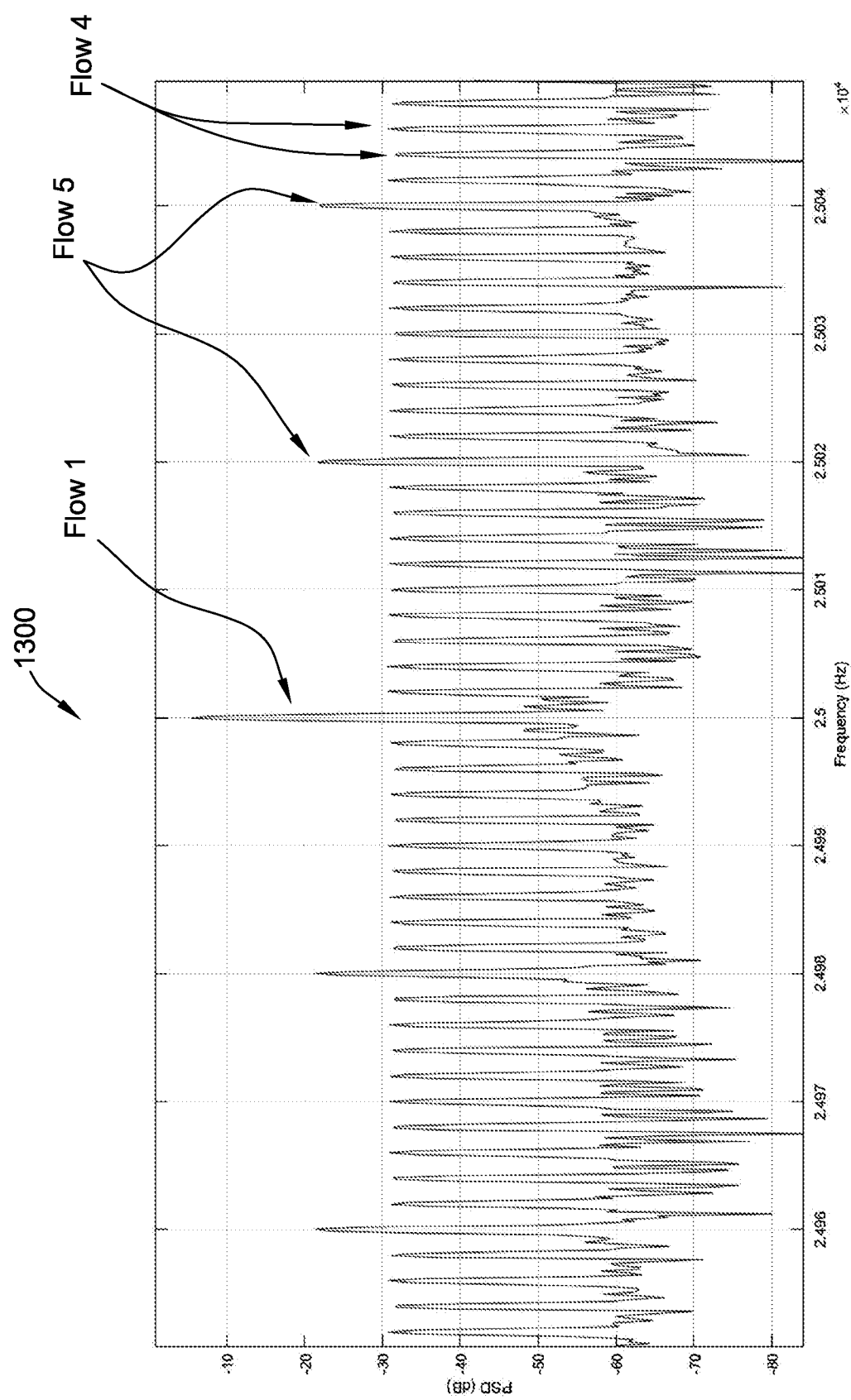
FIG. 13 illustrates a fifth graph of a fifth analysis of traffic flows using the algorithm shown in FIG. 4.

FIG. 13 illustrates a fifth graph 1300 of a fifth analysis of traffic flows using the algorithm 400 (shown in FIG. 4).

Figure 14:
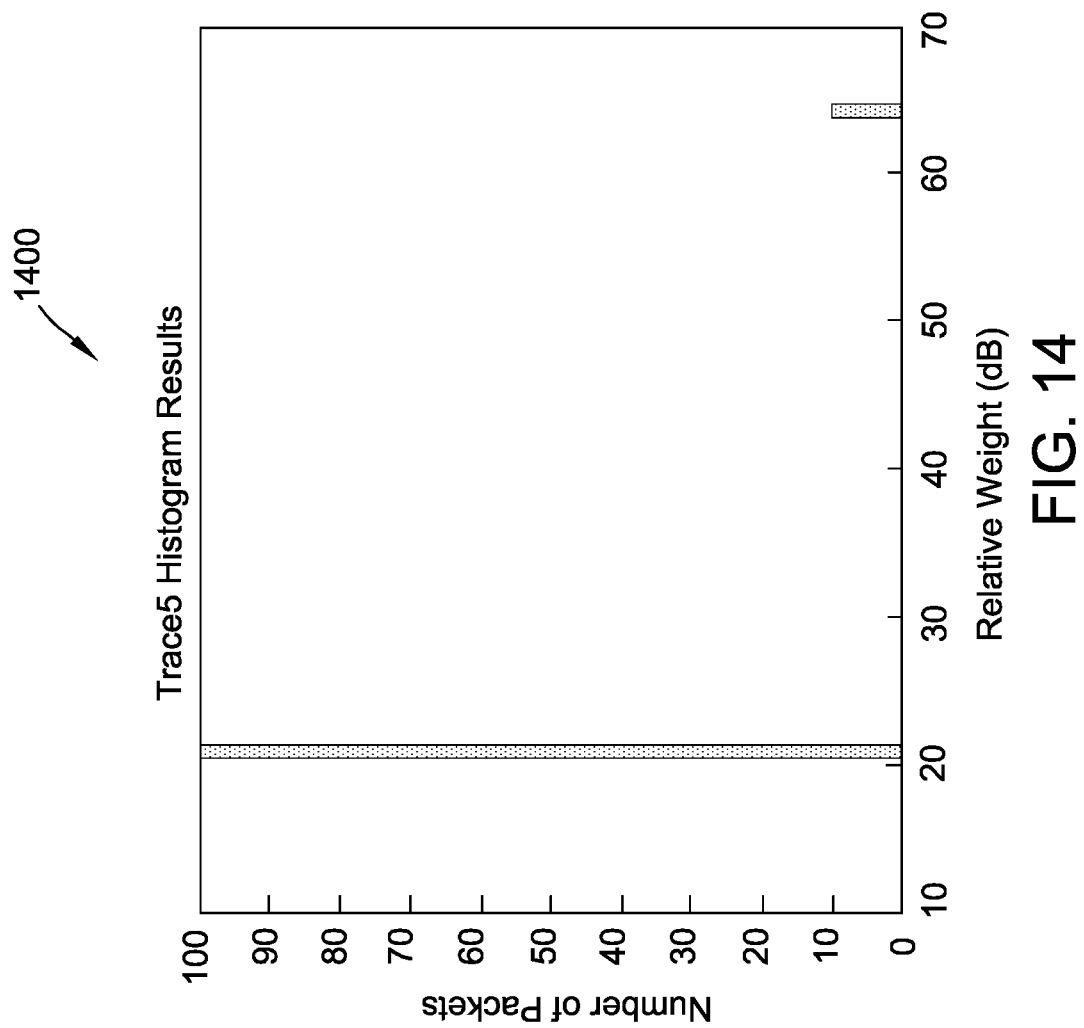
FIG. 14 illustrates a fifth histogram of the fifth analysis of traffic flows shown in FIG. 13.

Graph 1300 shows the dominant flow at 25 kHz (Flow 1), a second flow repeating at 20 Hz (Flow 5), and a third flow repeating at 2 Hz (Flow 4). FIG. 14 illustrates a fifth histogram 1400 of the fifth analysis of traffic flows shown in FIG. 13. Histogram 1400 illustrates 10 packets at 64 dB and 100 packets at 21 dB. Accordingly, the second flow is providing 100 packets at 20 packets per second and the third flow is providing 10 packets at 2 packets per second.

Figure 15:
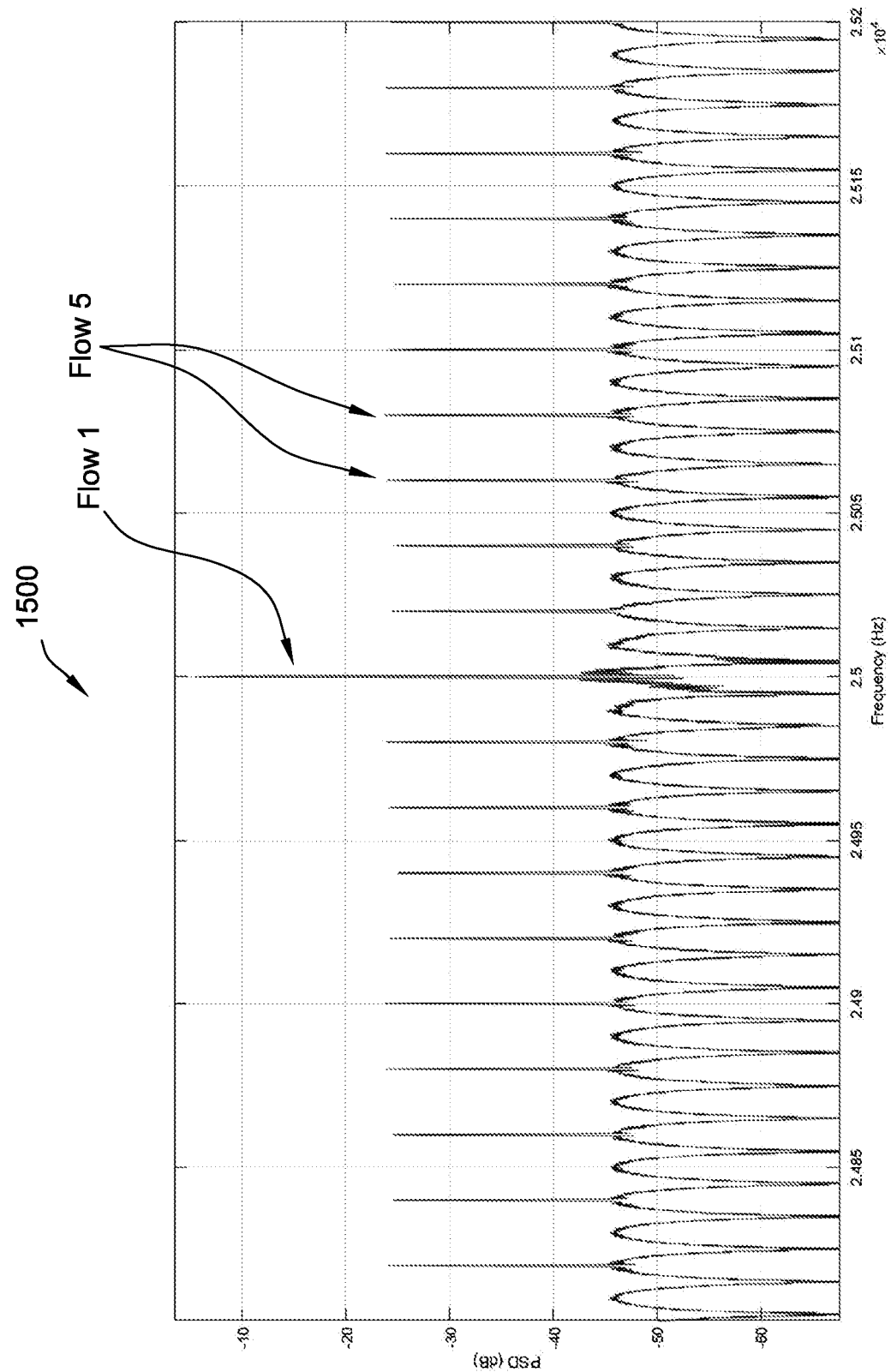
FIG. 15 illustrates a sixth graph of a sixth analysis of traffic flows using the algorithm shown in FIG. 4.
Figure 16:
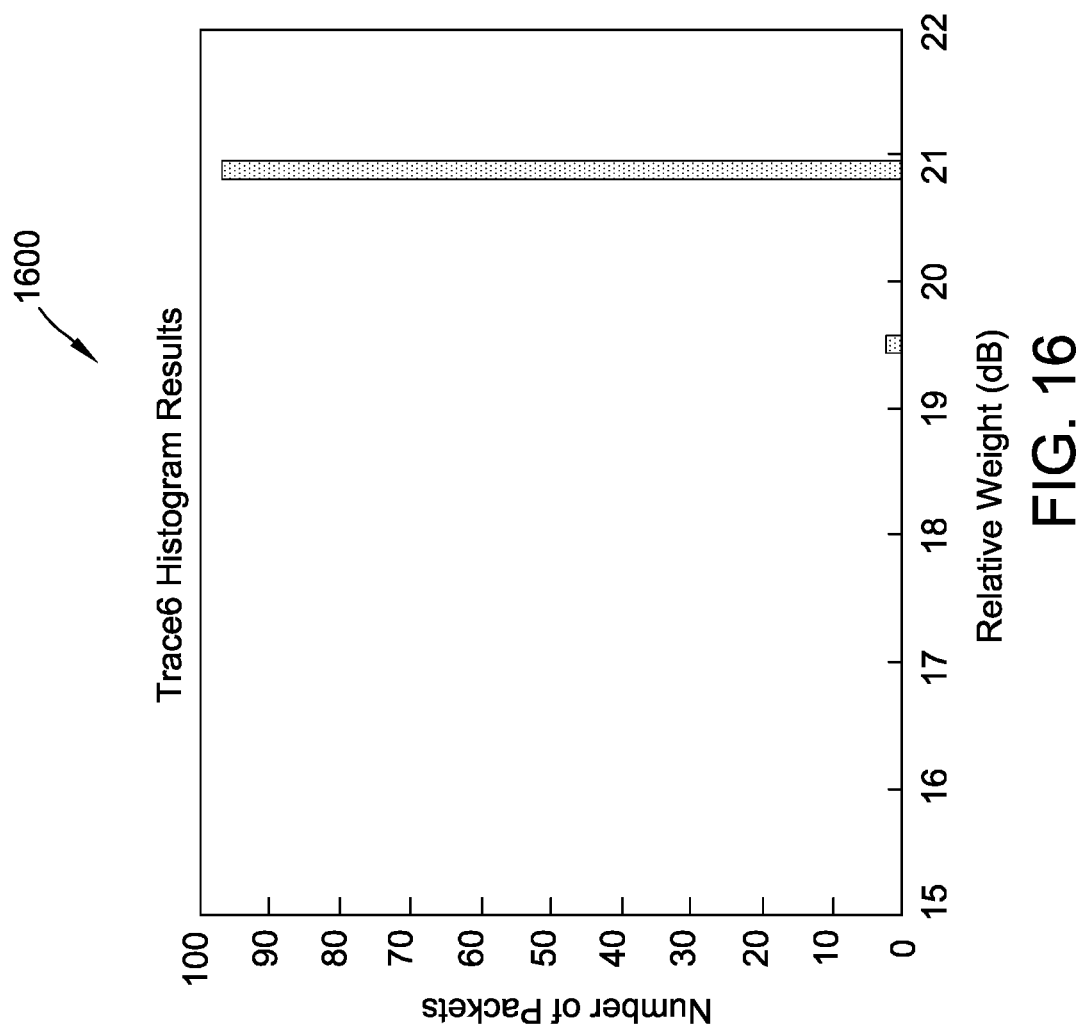
FIG. 16 illustrates a sixth histogram of the sixth analysis of traffic flows shown in FIG. 15.

FIG. 15 illustrates a sixth graph 1500 of a sixth analysis of traffic flows using the algorithm 400 (shown in FIG. 4). Graph 1500 shows the dominant flow at 25 kHz (Flow 1) and a second flow repeatedly at 20 Hz (Flow 5). FIG. 16 illustrates a sixth histogram 1600 of the sixth analysis of traffic flows shown in FIG. 15. Histogram 1600 illustrates 3 packets at 19.5 dB and 97 packets at 21 dB. Accordingly, the second flow is providing 100 packets at 20 packets per second.

Figure 17:
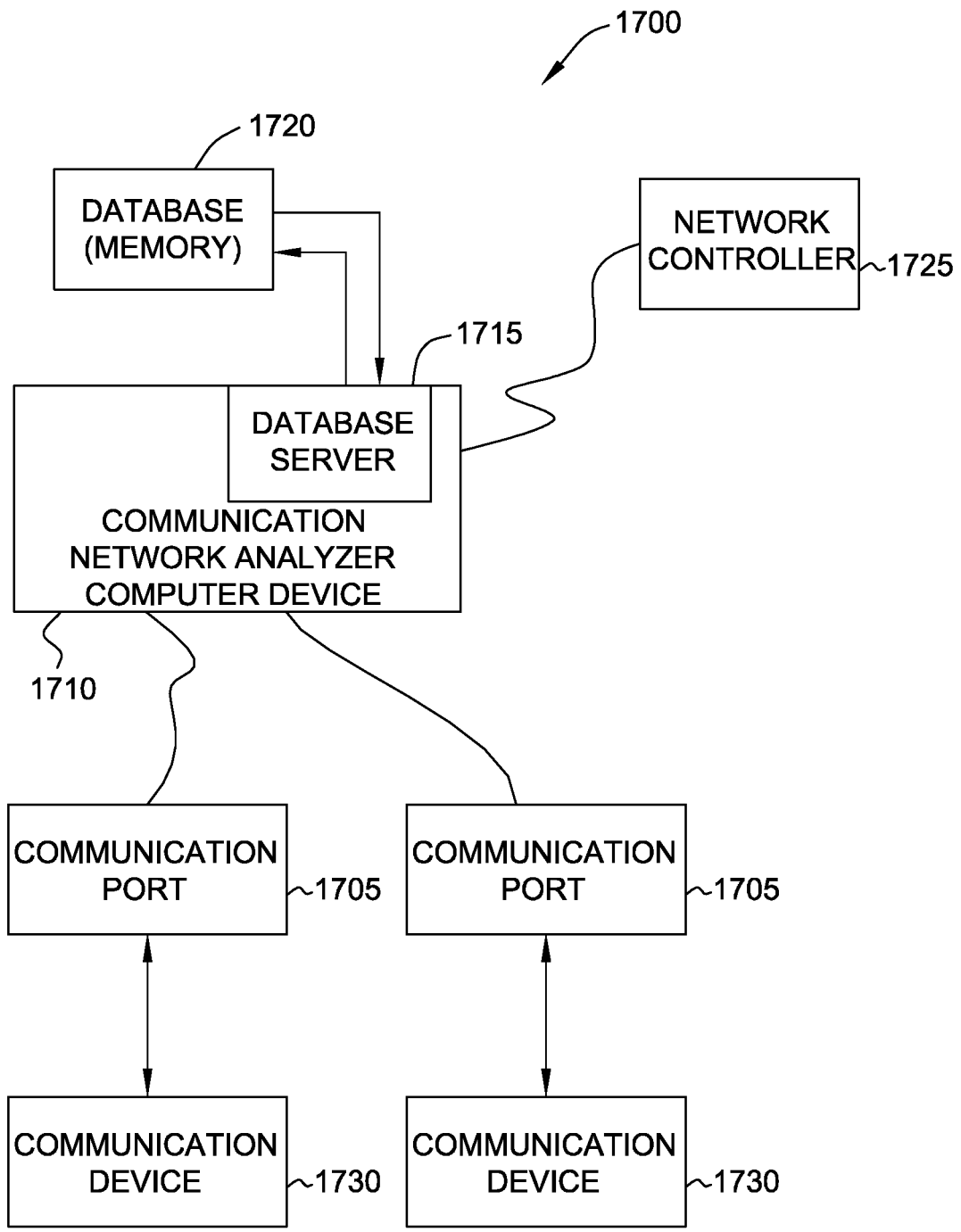
FIG. 17 illustrates a simplified block diagram of an example communication network analyzer ("CNA") system for analyzing communication traffic on the network shown in FIG. 2.

FIG. 17 illustrates a simplified block diagram of an example communication network analyzer ("CNA") system 1700 for analyzing communication traffic on the network 200 (shown in FIG. 2). In the example, CNA system 1700 is used for controlling the operation of an algorithm for monitoring the communications of satellites 100 (shown in FIG. 1) and other devices on the network 200. The algorithm monitors the communications on the network 200 for malicious data flows that may indicate cyber-security threats and attacks to allow other systems to potential respond to the identified detected cybersecurity threats and attacks.

The CNA system 1700 includes a CNA computer device 1710 in communication with one or more communication ports 1705. The CNA computer device 1710 can be similar to packet switch 114 or other processing unit executing on a satellite 100 (both shown in FIG. 1) or user device 210 (shown in FIG. 2) in network 200. In some examples, packet switch 114 is co-located with one or more additional processors that can perform one or more steps of algorithm 400 (shown in FIG. 4). The communication ports 1705 can be similar to port 116 (shown in FIG. 1). The one or more communication ports 1705 are each in communication with a communication device 1730. The communication devices 1730 can be similar to satellite 100 and/or user device 210. In an example, the CNA computer device is also in communication with a network controller 1725 which provides security policies to the CNA computer device 1710. The CNA computer device 1710 can also be in communication with a database server 1715 for retrieving and storing data in a database 1720.

The CNA computer device 1710 is programmed to receive signature information and/or security policies about different configurations of the computer network 200. The security policies can include information about the network topology so that the algorithm analyzing the traffic flows can recognize expected data flows and detect unexpected data flows when they are present. In some embodiments, the security policies include a signature of expected traffic flows for the current configuration of the network. The security policies can include information, such as, but not limited to, when a user is supposed to connect, how long they will connect, the MOD/COD of the connection 118, the data rate of the connection 118, the demand over the connection 118 will be for a defined number of data flows, information about those data flows, such as packet sizes, how the application is transmitting those data packets, arrival times, protocols (if available) and the like. All of that information is compiled on a per connection 118 basis. The security policies can be based on network information such as, but not limited to, the knowledge of the satellites 100 (shown in FIG. 1) in the network 200 at a specific point in time or during a defined interval of time, including where the satellites 100 are located, which device 100 and 210 is connected to, and which device 100 and 210 should be connected to at each specific point in time or during specified intervals of time, and/or the duration of each connection 118. The network information can also include, but is not limited to, how the user devices 210 are connected to the network 200 and the satellites 100, the types of connections 118 between the satellites 100 themselves and between the satellites 100 and the user devices 210, the MOD/COD (modulation and coding, where coding refers to FEC (forward error correction) overhead), the data rates, and the traffic profiles (what kind of traffic are users expected to generate) along the network 200 for each network configuration 202 and 302 (shown in FIGS. 2 and 3, respectively). In some examples, the CNA computer device 1710 receives the security policy from the network controller 1725. In other examples, the CNA computer device 1710 stores a plurality of security policies and uses different security policies at different points in time based on the configuration of the network 200. In some examples, all of the connections 212 and 214 (both shown in FIG. 2) are known in advance. In some of these examples, the algorithm control 1725 transmits a signal indicating when to use each security policy. In other of these examples, the network controller 1725 transmits a schedule, which informs the CNA computer device 1710 when to use which security policy. In some examples, the CNA computer device 1710 stores a plurality of different algorithms. In some of these examples, the network controller 1725 informs the CNA computer device 1710 which algorithm to use when and with which security policy.

In other examples, one or more user devices 210 may be able to connect to the network 200 on an ad-hoc basis. In these examples, the new user device 210 negotiates a connection 118 to the network 200. The new user device's information is passed to the network controller 1725 or the CNA computer device 1710, which generates a new security policy for the new user device 210 and for the devices 100 and 210 that have connections 118 to the new user device 210.

The CNA computer device 1710 uses a security policy for communication port 1705 with a connection 118 to a communication device 1730. In the example, the CNA computer device 1710 executes an algorithm for monitoring each connection 118, where the algorithms are configured to use the security policies to monitor the communication ports 1705 associated with one or more connections 118 for malicious traffic flows. The CNA computer device 1710 activates the appropriate algorithms and the appropriate security policies when the network 200 is in the corresponding configuration.

For example, based on network configurations 202 and 302, the CNA computer device 1710 determines that the first network configuration 202 will be valid from Time A to Time B and the second network configuration 302 will be valid from Time B to Time C. Furthermore, the CNA computer device 1710 knows the security policy for each network configuration 202 and 302. This security policy can be stored in database 1720 or received from network controller 1725.

For each network configuration 202 and 302, the CNA computer device 1710 determines which algorithm and security policy to use monitoring each connection 118. For example, in the first network configuration 202, the CNA computer device 1710 associated with satellite #1 determines which security policy to run with the algorithm, (such as algorithm 400 shown in FIG. 4) to run on satellite #1 for the ISL connection 212 to satellite #2. The CNA computer device 1710 can use a different security policy to use in monitoring the ISL connection 212 to satellite #2. Furthermore, the CNA computer device 1710 can simultaneously execute multiple copies of the algorithm, one for each communication port 1705 with an active connection 118. The different copies of the algorithm can each be using different security policies based on their connection and the configuration of the network 200. The CNA computer device 1710 associated with satellite #2 determines which algorithm to run on satellite #2 for the ISL connection 212 and determines which security policy to use for satellite #2's algorithm to monitor the ISL connection 212. The algorithms and security policies executing on each satellite 100 can be different on different satellites 100 or even different ports 116 of the same satellite 100. The CNA computer device 1710 and/or network controller 1725 selects the algorithms and security policies based on one or more attributes of the satellites in question and/or the configuration of the network 200.

The CNA computer devices 1710 ensure that the appropriate algorithms and security policies are activated on the corresponding satellites 100 at the correct time. In some examples, the CNA computer device 1710 receives the security policies and algorithms from the network controller 1725 in advance, along with a schedule that instructs the CNA computer device 1710 when to activate each algorithm and security policy. For example, the CNA computer device 1710 can receive the algorithms and security policies for the first network configuration 202 and the second network configuration 302. When Time A begins, then the CNA computer device 1710 associated each satellite 100 activates the predetermined algorithm and security policies associated with the first network configuration 202. When Time B is reached, then the CNA computer device 1710 associated with each satellite 100 activates the predetermined algorithm and security policies associated with the second network configuration 302, and so forth. In these examples, the network controller 1725 can transmit the algorithms and security policies to the CNA computer devices 1710 well in advance of the beginning of the corresponding network configurations. Furthermore, in some examples, a network configuration can be repeated at multiple points in time. In these examples, each CNA computer devices 1710 can store a plurality of algorithms and security policies and the CNA computer device 1710 can receive a signal from the network controller 1725 including which algorithm and security policy to activate at different points in time. In other examples, the network controller 1725 transmits one or more of the appropriate algorithms and the security policies to the CNA computer device 1710 at the beginning of a new network configuration. While the above is stated with respect satellites 100, any communication device can be used with the systems and methods describe herein. In some examples, instead of a schedule, each of the security policies includes an active time attribute, and the CNA computer device 1710 activates that security policy at the appropriate time.

In the example, CNA computer devices 1710 are systems, such as the packet switch 114 (shown in FIG. 1) that can execute algorithms and security policies to monitor communications 118 on ports 116 (both shown in FIG. 1). In other examples, the CNA computer device 1710 could also be, but are not limited to, a network card, repeater hub, network bridge, switching hub, bridging hub, MAC bridge, or any other device configured to transmit and receive messages, such as data packets. In the example, the CNA computer device 1710 is in communication with the network controller 1725 to receive signals about which algorithms and security policies to use when. In the example, the network controller 1725 can communicate with the CNA computer devices 1710 over ISL connections 212 and DL connections 214. The CNA computer device 1710 can also provide information to the network controller 1725, user devices 210 (shown in FIG. 2), or other communication devices 1730 about detected potential malicious data flows or other deviations from the security policies. In other examples, algorithm 400 could be executed in a centralized location, where a computer device at the centralized location monitors communications (i.e., data flows) in the network 200 and reviews those communications in view of the appropriate security policies. CNA computer devices 1710 can be a part of satellites 100 or user devices 210, where connections 118 over ports 116 are available to be monitored.

In the example, communication devices 1730 are computers that include a web browser or a software application, which enables client communication devices 1730 to communicate with the CNA computer device 1710 using the Internet, a local area network (LAN), or a wide area network (WAN). In some examples, the communication devices 1730 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Communication devices 1730 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. In at least one example, one or more communication devices 1730 include a web browser that can be used to output information to the network controller 1725 or the CNA computer device 1710, such as to provide context information about one or more configurations of the network 200 or one or more warnings about malicious data flows. In some examples, the communication devices 1730 monitor or control the path of a satellite 100 and provide information about the satellite 100. In other examples, the communication devices 1730 facilitate communication between the CNA computer devices 1710 and the network controller 1725.

The application includes information about the satellites 100 and the user devices 210 in the network 200 and is able to determine which algorithms and which security policies to use at specific points in time or specific network configurations to monitor the data flows of the computer network 200. The application can be provided as a cloud-based web-service over the Internet or other network. In some examples, the network controller 1725 includes at least one application executing on the network controller 1725 to perform the network analysis.

A database server 1715 is communicatively coupled to a database 1720 that stores data. In one example, the database 1720 includes a plurality of satellite communication attributes, a plurality of attributes of algorithms, a plurality of security policy information, and additional information about user devices 210. In some examples, the database 1720 is stored remotely from the CNA computer device 1710. In some examples, the database 1720 is decentralized. In the example, a person can access the database 1720 via a user device 210 by logging onto at least one of a CNA computer device 1710 and a network controller 1725.

At a high level, the algorithm is executing on an FPGA or other processor that is a part of the CNA computer device 1710. The algorithm generates data, such as statistical data in the form of logs. The algorithm can be collocated on a satellite 100, user device 210, or communication device 1730 and also running on a computer device, such as a network controller 1725. The computer device then interprets the logs. Based on the review of the algorithm's logs something can be detected. Based on detection, the network controller 1725, the CNA computer device 1710, or other client device can notify an operations center, a security center, or take an action. Actions could include, but are not limited to, providing notifications, alerts, triggering another program, changing the topology of the network, or blocking traffic.

Figure 18:
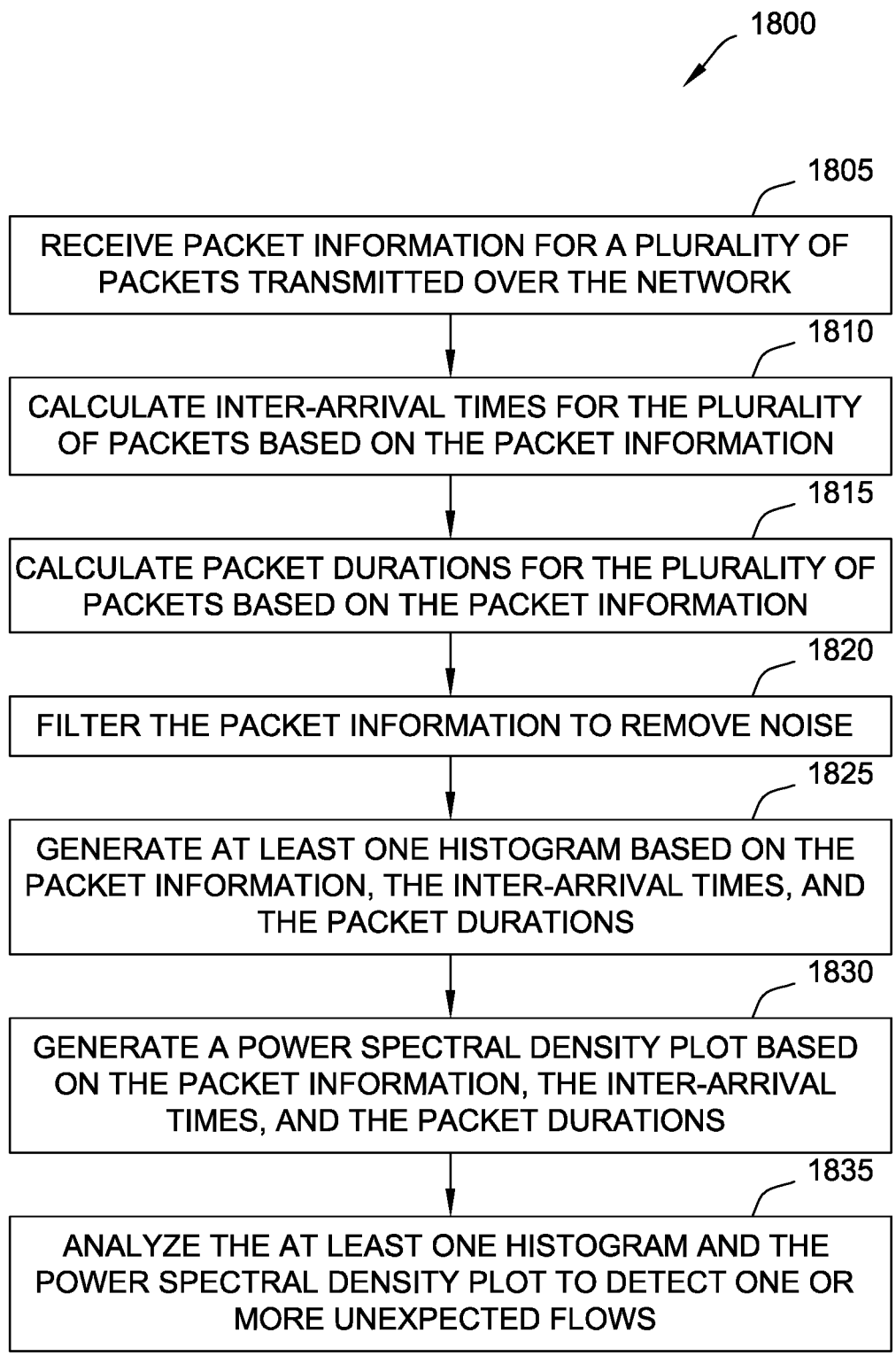
FIG. 18 illustrates an example process for analyzing communication traffic on the network shown in FIG. 2 and using the system shown in FIG. 17.

FIG. 18 illustrates an example process 1800 for analyzing communication traffic on the network 200 (shown in FIG. 2) and using the system 1700 (shown in FIG. 17). The steps of process 1800 can be performed by the packet switch 114 of a satellite 100 both shown in FIG. 1) or other device 210 (shown in FIG. 2) and/or the CNA computer device 1710 (shown in FIG. 17). In at least one example, the packet switch 114 executing process 1800 is on a satellite 100. In one example, the packet switch 114 executes process 1800 for each port 116 (shown in FIG. 1) that is in communication 118 (shown in FIG. 1) with another communication device 1730 (shown in FIG. 17). In some examples, the packet switch 114 executes a different instantiation of process 1800 for each active port 116. In other examples, packet switch 114 executes one instantiation of process 1800 that monitors multiple ports 116.

The CNA computer device 1710 or packet switch 114 is in communication with one or more of the devices in the network 200. The devices in the network can include, but are not limited to, satellites 100, user devices 210, communication devices 1730, and network controllers 1725 (shown in FIG. 17).

The CNA computer device 1710 receives 1805 packet information for a plurality of data packets transmitted over the network 200 (shown in FIG. 2). The packet information includes, but is not limited to, packet arrival times 402, packet length 404, and packet bit rate 406 (all shown in FIG. 4). The CNA computer device 1710 monitors the data packets being transmitted over or received through one or more ports 116 in real-time. The CNA computer device 1710 determines the packet information based on reviewing the plurality of data packets being transmitted by the satellites 100 or user devices 210 through the ports 116.

The CNA computer device 1710 calculates 1810 inter-arrival times 408 (shown in FIG. 4) for the plurality of data packets based on the packet information. The CNA computer device 1710 adjusts the plurality of inter-arrival times for the plurality of data packets to remove gaps 410 (shown in FIG. 4). The CNA computer device 1710 computes inter-arrival rate 412 (shown in FIG. 4) for the plurality of data packets based on the packet information. The CNA computer device 1710 computes median (or mean) inter-arrival rate 414 (shown in FIG. 4) for the plurality of data packets. Then the CNA computer device 1710 adjusts the plurality of inter-arrival times to remove one or more gaps 410 based on the median inter-arrival rate 414.

The CNA computer device 1710 calculates 1815 packet durations 420 (shown in FIG. 4) for the plurality of data packets based on the packet information. The CNA computer device 1710 filters 1820 the packet information to remove noise and jitter. The CNA computer device 1710 applies a detection threshold 434 (shown in FIG. 4) to the plurality of data packets to filter the packet information to remove noise. The CNA computer device 1710 generates 1825 at least one histogram 432 (shown in FIG. 4) based on the packet information, the inter-arrival times 408, and the packet durations 420. The CNA computer device 1710 also generates 1830 a power spectral density estimate 446 (shown in FIG. 4) based on the packet information, the inter-arrival times 408, and the packet durations 420.

The CNA computer device 1710 analyzes 1835 the at least one histogram 432 and the power spectral density estimate 446 to detect one or more unexpected data flows. The CNA computer device 1710 detects one or more data flows 448 (shown in FIG. 4) in the at least one histogram 432 and the power spectral density estimate 446. The CNA computer device 1710 compares the one or more detected data flows to one or more expected data flows. The CNA computer device 1710 detects the one or more unexpected data flows based on the comparison. In one example, the CNA computer device 1710 filters the one or more expected data flows from the at least one histogram 432 and analyzes the at least one filtered histogram 432 to detect one or more unexpected data flows.

Based on detection of one or more unexpected data flows, the CNA computer device 1710 reports the one or more unexpected data flows. The CNA computer device 1710 can transmit the notification to the network controller 1725. In addition, the network controller 1725, the CNA computer device 1710, or other client device can notify an operations center, a security center, or take an action. Actions could include, but are not limited to, providing notifications, alerts, triggering another program, changing the topology of the network, or blocking traffic.

The CNA computer device 1710 can receive a security policy including the one or more expected data flows and store the security policy. The CNA computer device 1710 can also store a plurality of security policies. Each security policy of the plurality of security policies is associated with a configuration 202 or 302 (both shown in FIG. 3) of the network 200. The CNA computer device 1710 activates a security policy associated with a current configuration 202 of the network 200.

In some examples where the CNA computer device 1710 stores one or more security policies, the CNA computer device 1710 receives a security policy from the network controller 1725 (shown in FIG. 17) to activate at that point in time. In other examples where the CNA computer device 1710 stores one or more security policies, the CNA computer device 1710 receives a signal from the network controller 1725 instructing the CNA computer device 1710 to activate on of the stored security policies. In further examples where the CNA computer device 1710 stores one or more security policies, the CNA computer device 1710 can also receive a schedule from the network controller 1725. The schedule comprises the active times of when each algorithm and security policy is to be activated. The CNA computer device 1710 activates the corresponding algorithm and security policy based on the script. For example, the script can include all of the algorithms and security policies to be used during a day, hour, or other period of time for the network 200. The security policies can include information about the expected data flows.

Figure 19:
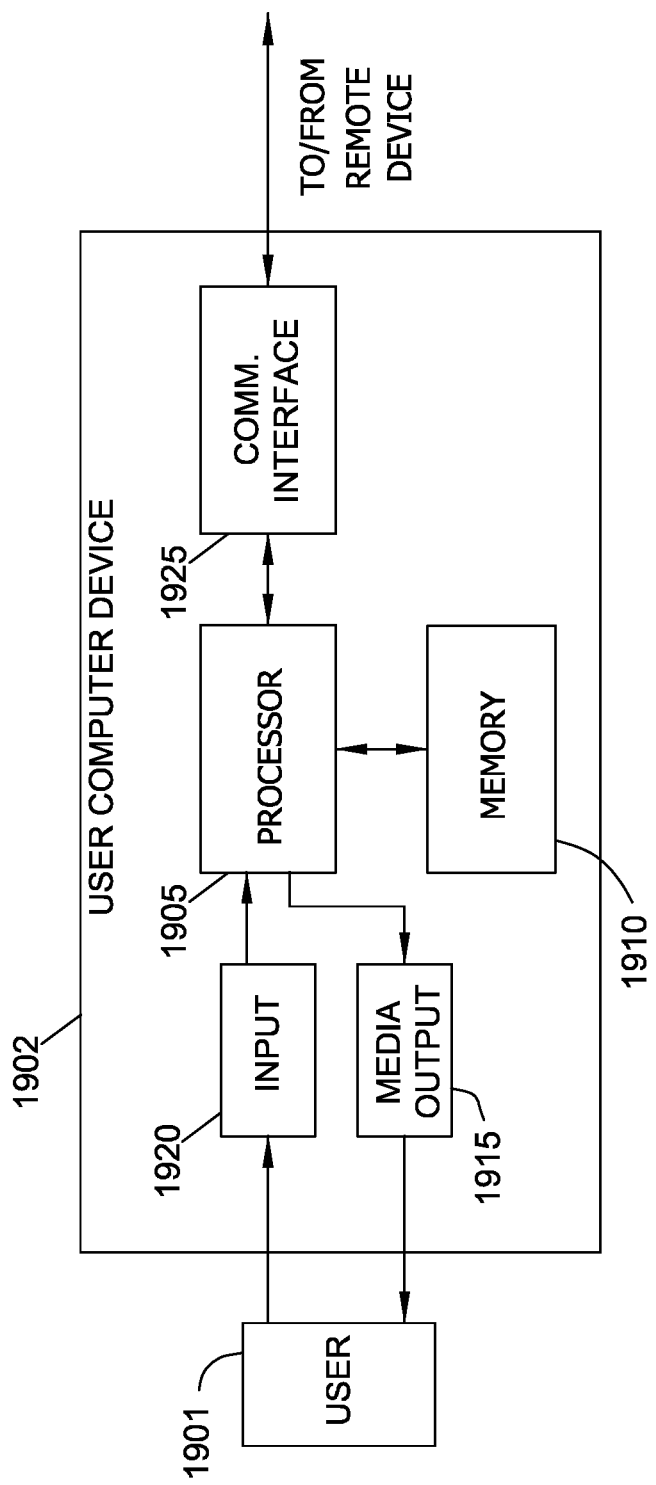
FIG. 19 illustrates an example configuration of a user computer device used in the system shown in FIG. 17, in accordance with one example of the present disclosure.

FIG. 19 illustrates an example configuration of a user computer device 1902 used in the CNA system 1700 (shown in FIG. 17), in accordance with one example of the present disclosure. User computer device 1902 is operated by a user

1901. The user computer device 1902 can include, but is not limited to, satellites 100, packet switches 114 (both shown in FIG. 1), user devices 210 (shown in FIG. 2), the communication device 1730, and the network controller 1725 (both shown in FIG. 17). The user computer device 1902 includes a processor 1905 for executing instructions. In some examples, executable instructions are stored in a memory area 1910. The processor 1905 can include one or more processing units (e.g., in a multi-core configuration). The memory area 1910 is any device allowing information such as executable instructions and/or transaction data to be stored and retrieved. The memory area 1910 can include one or more computer-readable media.

The user computer device 1902 also includes at least one media output component 1915 for presenting information to the user 1901. The media output component 1915 is any component capable of conveying information to the user 1901. In some examples, the media output component 1915 includes an output adapter (not shown) such as a video adapter and/or an audio adapter. An output adapter is operatively coupled to the processor 1905 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some examples, the media output component 1915 is configured to present a graphical user interface (e.g., a web browser and/or a client application) to the user 1901. A graphical user interface can include, for example, an interface for viewing the monitoring data about a network 200 (shown in FIG. 2). In some examples, the user computer device 1902 includes an input device 1920 for receiving input from the user 1901. The user 1901 can use the input device 1920 to, without limitation, input network configuration information. The input device 1920 can include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen can function as both an output device of the media output component 1915 and the input device 1920.

The user computer device 1902 can also include a communication interface 1925, communicatively coupled to a remote device such as the CNA computer device 1710 (shown in FIG. 7). The communication interface 1925 can include, for example, a wired or wireless network adapter and/or a wireless data transceiver for use with a mobile telecommunications network.

Stored in the memory area 1910 are, for example, computer-readable instructions for providing a user interface to the user 1901 via the media output component 1915 and, optionally, receiving and processing input from the input device 1920. A user interface can include, among other possibilities, a web browser and/or a client application. Web browsers enable users, such as the user 1901, to display and interact with media and other information typically embedded on a web page or a website from the CNA computer device 1710. A client application allows the user 1901 to interact with, for example, the CNA computer device 1710. For example, instructions can be stored by a cloud service, and the output of the execution of the instructions sent to the media output component 1915.

The processor 1905 executes computer-executable instructions for implementing aspects of the disclosure.

Figure 20:
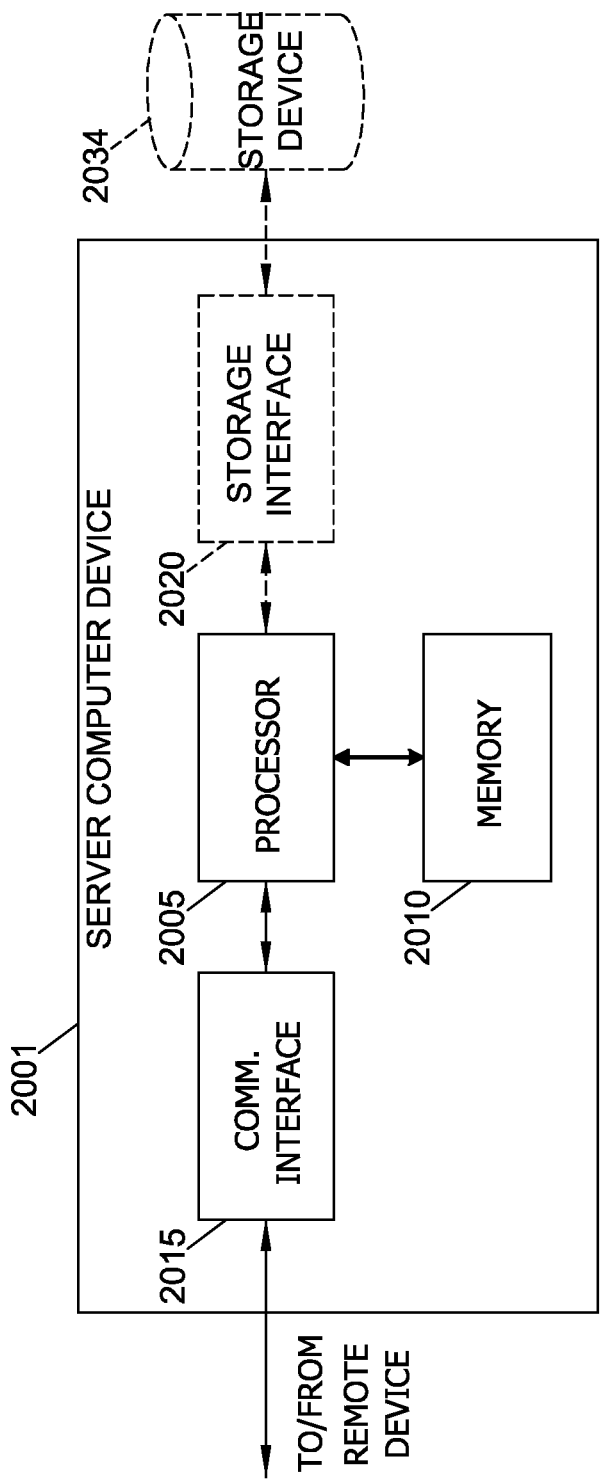
FIG. 20 illustrates an example configuration of a server computer device used in the system shown in FIG. 17, in accordance with one example of the present disclosure.

FIG. 20 illustrates an example configuration of a server computer device 2001 used in the CNA system 1700 (shown in FIG. 17), in accordance with one example of the present disclosure. Server computer device 2001 can include, but is not limited to, the CNA computer device 1710, the database server 1715, and the network controller 1725 (all shown in FIG. 17). The server computer device 2001 also includes a processor 2005 for executing instructions. Instructions can be stored in a memory area 2010. The processor 2005 can include one or more processing units (e.g., in a multi-core configuration).

The processor 2005 is operatively coupled to a communication interface 2015 such that the server computer device 2001 is capable of communicating with a remote device such as another server computer device 2001, a CNA computer device 1710, another network controller 1725, or the communication device 1730 (shown in FIG. 17). For example, the communication interface 2015 can receive requests from the network controller 1725 via the Internet, as illustrated in FIG. 17.

The processor 2005 can also be operatively coupled to a storage device 2034. The storage device 2034 is any computer-operated hardware suitable for storing and/or retrieving data, such as, but not limited to, data associated with the database 1720 (shown in FIG. 17). In some examples, the storage device 2034 is integrated in the server computer device 2001. For example, the server computer device 2001 can include one or more hard disk drives as the storage device 2034. In other examples, the storage device 2034 is external to the server computer device 2001 and can be accessed by a plurality of server computer devices 2001. For example, the storage device 2034 can include a storage area network (SAN), a network attached storage (NAS) system, and/or multiple storage units such as hard disks and/or solid state disks in a redundant array of inexpensive disks (RAID) configuration.

In some examples, the processor 2005 is operatively coupled to the storage device 2034 via a storage interface 2020. The storage interface 2020 is any component capable of providing the processor 2005 with access to the storage device 2034. The storage interface 2020 can include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 2005 with access to the storage device 2034.

The processor 2005 executes computer-executable instructions for implementing aspects of the disclosure. In some examples, the processor 2005 is transformed into a special purpose microprocessor by executing computer-executable instructions or by otherwise being programmed. For example, the processor 2005 is programmed with instructions such as those shown in FIG. 18.

As used herein, a processor can include any programmable system including systems using micro-controllers; reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "cybersecurity threat" includes an unauthorized attempt to gain access to a subject system. Cybersecurity threats, also known as cyber-attacks or cyber-threats, attempt to breach computer systems by taking advantage of vulnerabilities in the computer systems. Some cybersecurity threats include attempts to damage or disrupt a subject system. These cybersecurity threats can include, but are not limited to, active intrusions, spyware, malware, viruses, and worms. Cybersecurity threats may take many paths (also known as attack paths) to breach a system. These paths may include operating system attacks, misconfiguration attacks, application level attacks, and shrink wrap code attacks. Cybersecurity threats may be introduced by individuals or systems directly accessing a computing device, remotely via a communications network or connected system, or through an associated supply chain.

As used herein, the term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Washington). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, CA). In yet a further example, the system is run on a Mac OS® environment (Mac OS is a registered trademark of Apple Inc. located in Cupertino, CA). In still yet a further example, the system is run on Android® OS (Android is a registered trademark of Google, Inc. of Mountain View, CA). In another example, the system is run on Linux® OS (Linux is a registered trademark of Linus Torvalds of Boston, MA). The application is flexible and designed to run in various different environments without compromising any major functionality.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The patent claims at the end of this document are not intended to be construed under 35 U.S.C. § 112(f) unless traditional means-plus-function language is expressly recited, such as "means for" or "step for" language being expressly recited in the claim(s).

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The methods and system described herein can be implemented using computer programming or engineering techniques including computer software, firmware, hardware, or any combination or subset. As disclosed above, at least one technical problem with prior systems is that there is a need for systems for monitoring communication networks, where the networks can change over time. The system and methods described herein address that technical problem. Additionally, at least one of the technical solutions to the technical problems provided by this system can include: (i) monitoring message traffic data in real-time; (ii) monitoring encrypted message traffic; (iii) improved detection of infrequent or small packet data flows amongst other traffic; (iv) allowing for message traffic monitoring without requiring extensive infrastructure updates; (v) monitoring message traffic data for changing networks; and (vi) requiring less packet data to allow for monitoring message traffic data.

The methods and systems described herein can be implemented using computer programming or engineering techniques including computer software, firmware, hardware, or any combination or subset thereof, wherein the technical effects can be achieved by performing at least one of the following steps: a) based on packet information received for a plurality of data packets transmitted over the network, calculate inter-arrival times and packet durations for the plurality of data packets, wherein the packet information includes arrival times associated with the plurality of data packets, a length of the plurality of data packets, and a bit rate of the plurality of data packets, wherein the computer system is associated with a packet switch; b) filter the packet information to remove noise; c) generate at least one histogram based on the packet information, the inter-arrival times, and the packet durations; d) generate a power spectral density estimate based on the packet information, the inter-arrival times, and the packet durations; e) analyze the at least one histogram and the power spectral density estimate to detect one or more unexpected data flows; f) report the one or more unexpected data flows; g) determine the packet information based on reviewing the plurality of data packets being transmitted by the computer system; h) adjust the inter-arrival times for the plurality of data packets to remove one or more gaps; i) compute inter-arrival rate for the plurality of data packets based on the packet information; j) compute median inter-arrival rate for the plurality of data packets; k) adjust the inter-arrival times to remove the one or more gaps based on the median inter-arrival rate; l) apply a detection criterion to the histogram results of the plurality of data packets to filter the packet information to remove the noise; m) detect one or more data flows in the at least one histogram and the power spectral density estimate; n) compare the one or more detected data flows to one or more expected data flows; o) detect the one or more unexpected data flows based on the comparison; p) filter the one or more expected data flows from the at least one histogram; o) analyze the at least one filtered histogram to detect the one or more unexpected data flows; p) receive a security policy including the one or more expected data flows; q) store the security policy; r) store a plurality of security policies, wherein each security policy of the plurality of security policies is associated with a configuration of the network; and s) activate a security policy associated with a current configuration of the network.

In some further embodiments, the technical effects can be achieved by performing at least one of the following steps: a) receiving, by the processor, packet information for a plurality of data packets transmitted over the network; b) calculating, by the processor, inter-arrival times for the plurality of data packets based on the packet information; c) calculating, by the processor, packet durations for the plurality of data packets based on the packet information; d) filtering, by the processor, the packet information to remove noise; e) generating, by the processor, at least one histogram based on the packet information, the inter-arrival times, and the packet durations; f) generating, by the processor, power spectral density estimate based on the packet information, the inter-arrival times, and the packet durations; g) analyzing, by the processor, the at least one histogram and the power spectral density estimate to detect one or more unexpected data flows; h) reporting, by the processor, the one or more unexpected data flows; i) determining the packet information based on reviewing the plurality of data packets being transmitted by the computer system; j) adjusting the inter-arrival times for the plurality of data packets to remove one or more gaps; k) computing inter-arrival rate for the plurality of data packets based on the packet information; l) computing median inter-arrival rate for the plurality of data packets; m) adjusting of inter-arrival times to remove gaps based on the median inter-arrival rate; n) applying a detection threshold to the histogram results of the plurality of data packets to filter the packet information to remove the noise; o) detecting one or more data flows in the at least one histogram and the power spectral density estimate; p) comparing the one or more detected data flows to one or more expected data flows; q) filtering the one or more expected data flows from the at least one histogram; and r) analyzing the at least one filtered histogram to detect the one or more unexpected data flows.

In some additional embodiments, the technical effects can be achieved by performing at least one of the following steps: a) receive a security policy to execute on the system, wherein the security policy includes configuration data; b) receive packet information for a plurality of data packets transmitted over the network; c) calculate inter-arrival times for the plurality of data packets based on the packet information and the security policy; d) calculate, by the processor, packet durations for the plurality of data packets based on the packet information; e) filter the packet information to remove noise based on the security policy; f) generate at least one histogram based on the packet information, the inter-arrival times, and the packet durations; h) generate a power spectral density estimate based on the packet information, the inter-arrival times, and the packet durations; i) analyze the at least one histogram and the power spectral density estimate to detect one or more unexpected data flows based on the security policy; j) report the one or more unexpected data flows; and k) adjust the inter-arrival times for the plurality of data packets to remove one or more gaps based on the security policy.

The computer-implemented methods discussed herein can include additional, less, or alternate actions, including those discussed elsewhere herein. The methods can be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein can include additional, less, or alternate functionality, including that discussed elsewhere herein. The computer systems discussed herein can include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein can be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for detecting malicious traffic flows in a network comprising a computer system including at least one processor in communication with at least one memory device, wherein the at least one processor is programmed to:

based on packet information received for a plurality of data packets transmitted over the network, calculate inter-arrival times and packet durations for the plurality of data packets;

filter the packet information to remove noise;

generate at least one histogram based on the packet information, the inter-arrival times, and the packet durations;

generate a power spectral density estimate based on the packet information, the inter-arrival times, and the packet durations;

analyze the at least one histogram and the power spectral density estimate to detect one or more unexpected data flows; and report the one or more unexpected data flows.

2. The system of claim 1, wherein the at least one processor is further programmed to determine the packet information based on reviewing the plurality of data packets being transmitted by the computer system.

3. The system of claim 1, wherein the packet information includes arrival times associated with the plurality of data packets, a length of the plurality of data packets, and a bit rate of the plurality of data packets.

4. The system of claim 1, wherein the at least one processor is further programmed to adjust the inter-arrival times for the plurality of data packets to remove one or more gaps.

5. The system of claim 4, wherein the at least one processor is further programmed to:
compute inter-arrival rate for the plurality of data packets based on the packet information;
compute median inter-arrival rate for the plurality of data packets; and
adjust the inter-arrival times to remove the one or more gaps based on the median inter-arrival rate.

6. The system of claim 1, wherein the at least one processor is further programmed to apply a detection criterion to the histogram results of the plurality of data packets to filter the packet information to remove the noise.

7. The system of claim 1, wherein the at least one processor is further programmed to:
detect one or more data flows in the at least one histogram and the power spectral density estimate; and
compare the one or more detected data flows to one or more expected data flows.

8. The system of claim 7, wherein the at least one processor is further programmed to detect the one or more unexpected data flows based on the comparison.

9. The system of claim 7, wherein the at least one processor is further programmed to:
filter the one or more expected data flows from the at least one histogram; and
analyze the at least one filtered histogram to detect the one or more unexpected data flows.

10. The system of claim 7, wherein the at least one processor is further programmed to:
receive a security policy including the one or more expected data flows; and
store the security policy.

11. The system of claim 10, wherein the at least one processor is further programmed to store a plurality of security policies, wherein each security policy of the plurality of security policies is associated with a configuration of the network.

12. The system of claim 11, wherein the at least one processor is further programmed to activate a security policy associated with a current configuration of the network.

13. The system of claim 1, wherein the computer system is associated with a packet switch.

14. A method for detecting malicious traffic flows in a network, the method implemented by a computer system including at least one processor in communication with at least one memory device, wherein the method comprises:
receiving, by the processor, packet information for a plurality of data packets transmitted over the network;
calculating, by the processor, inter-arrival times for the plurality of data packets based on the packet information;
calculating, by the processor, packet durations for the plurality of data packets based on the packet information;
filtering, by the processor, the packet information to remove noise;
generating, by the processor, at least one histogram based on the packet information, the inter-arrival times, and the packet durations;
generating, by the processor, a power spectral density estimate based on the packet information, the inter-arrival times, and the packet durations;
analyzing, by the processor, the at least one histogram and the power spectral density estimate to detect one or more unexpected data flows; and
reporting, by the processor, the one or more unexpected data flows.

15. The method of claim 14 further comprising adjusting the inter-arrival times for the plurality of data packets to remove one or more gaps.

16. The method of claim 14 further comprising:
computing inter-arrival rate for the plurality of data packets based on the packet information;
computing median inter-arrival rate for the plurality of data packets; and
adjusting of inter-arrival times to remove gaps based on the median inter-arrival rate.

17. The method of claim 15 further comprising:
detecting one or more data flows in the at least one histogram and the power spectral density estimate; and
comparing the one or more detected data flows to one or more expected data flows.

18. The method of claim 17 further comprising:
filtering the one or more expected data flows from the at least one histogram; and
analyzing the at least one filtered histogram to detect the one or more unexpected data flows.

19. A system for detecting malicious traffic flows in a network comprising a computer system including at least one processor in communication with at least one memory device, wherein the at least one processor is programmed to:
receive a security policy to execute on the system, wherein the security policy includes configuration data;
receive packet information for a plurality of data packets transmitted over the network;
calculate inter-arrival times for the plurality of data packets based on the packet information and the security policy;
calculate, by the processor, packet durations for the plurality of data packets based on the packet information;
filter the packet information to remove noise based on the security policy;
generate at least one histogram based on the packet information, the inter-arrival times, and the packet durations;
generate a power spectral density estimate based on the packet information, the inter-arrival times, and the packet durations;
analyze the at least one histogram and the power spectral density estimate to detect one or more unexpected data flows based on the security policy; and
report the one or more unexpected data flows.

20. The system of claim 19, wherein the at least one processor is further programmed to adjust the inter-arrival times for the plurality of data packets to remove one or more gaps based on the security policy.

* * * * *